(12) United States Patent
Jung et al.

(10) Patent No.: US 10,572,085 B2
(45) Date of Patent: Feb. 25, 2020

(54) FINGERPRINT SENSOR AND DISPLAY DEVICE INCLUDING THE SAME

(71) Applicant: Samsung Display Co., Ltd., Yongin-si (KR)

(72) Inventors: Keum Dong Jung, Yongin-si (KR); Ki Seo Kim, Yongin-si (KR); Il Nam Kim, Yongin-si (KR); Kyung Tea Park, Yongin-si (KR); Yun Ho Kim, Yongin-si (KR); Jae Kyoung Kim, Yongin-si (KR); Won Sang Park, Yongin-si (KR); Jong In Baek, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 75 days.

(21) Appl. No.: 16/004,447

(22) Filed: Jun. 11, 2018

(65) Prior Publication Data

US 2019/0138123 A1     May 9, 2019

(30) Foreign Application Priority Data

Nov. 8, 2017    (KR) ........................ 10-2017-0147916

(51) Int. Cl.
     *G06F 3/044*      (2006.01)
     *G06K 9/00*      (2006.01)
     *G06F 3/041*      (2006.01)

(52) U.S. Cl.
     CPC ............ *G06F 3/044* (2013.01); *G06F 3/0412* (2013.01); *G06F 3/0418* (2013.01); *G06F 3/0446* (2019.05); *G06F 3/04166* (2019.05); *G06K 9/00006* (2013.01); *G06F 2203/04103* (2013.01)

(58) Field of Classification Search
     CPC ........ G06F 3/412; G06F 3/0416; G06F 3/044; G06F 2203/04103; G06K 9/0006
     USPC .................................................. 345/173, 174
     See application file for complete search history.

(56) References Cited

U.S. PATENT DOCUMENTS

| 70,185,190 | | 6/2017 | Jung et al. |
| 2016/0132176 | A1 | 5/2016 | Bae et al. |
| 2017/0185194 | A1 | 6/2017 | Kim et al. |
| 2017/0213065 | A1* | 7/2017 | Kurasawa ............ G06K 9/0002 |

FOREIGN PATENT DOCUMENTS

KR    10-2016-0057285     5/2016

\* cited by examiner

*Primary Examiner* — Calvin C Ma
(74) *Attorney, Agent, or Firm* — H.C. Park & Associates, PLC

(57) ABSTRACT

A fingerprint sensor including first, second, and third lines, and a unit sensor coupled to the first, the second, and the third lines. The unit sensor includes a pixel electrode coupled between the first line and the second line, a first capacitance element coupled between the first line and the pixel electrode, a second capacitance element coupled between the second line and the pixel electrode, a switching element coupled between the pixel electrode and one of the first line, the second line, a first line of an adjacent unit sensor, and a second line of the adjacent unit sensor, and including a control electrode coupled to the third line, and a third capacitance element coupled between the third line and the pixel electrode, in which at least one of the first and the second capacitance elements includes a variable capacitance element.

26 Claims, 29 Drawing Sheets

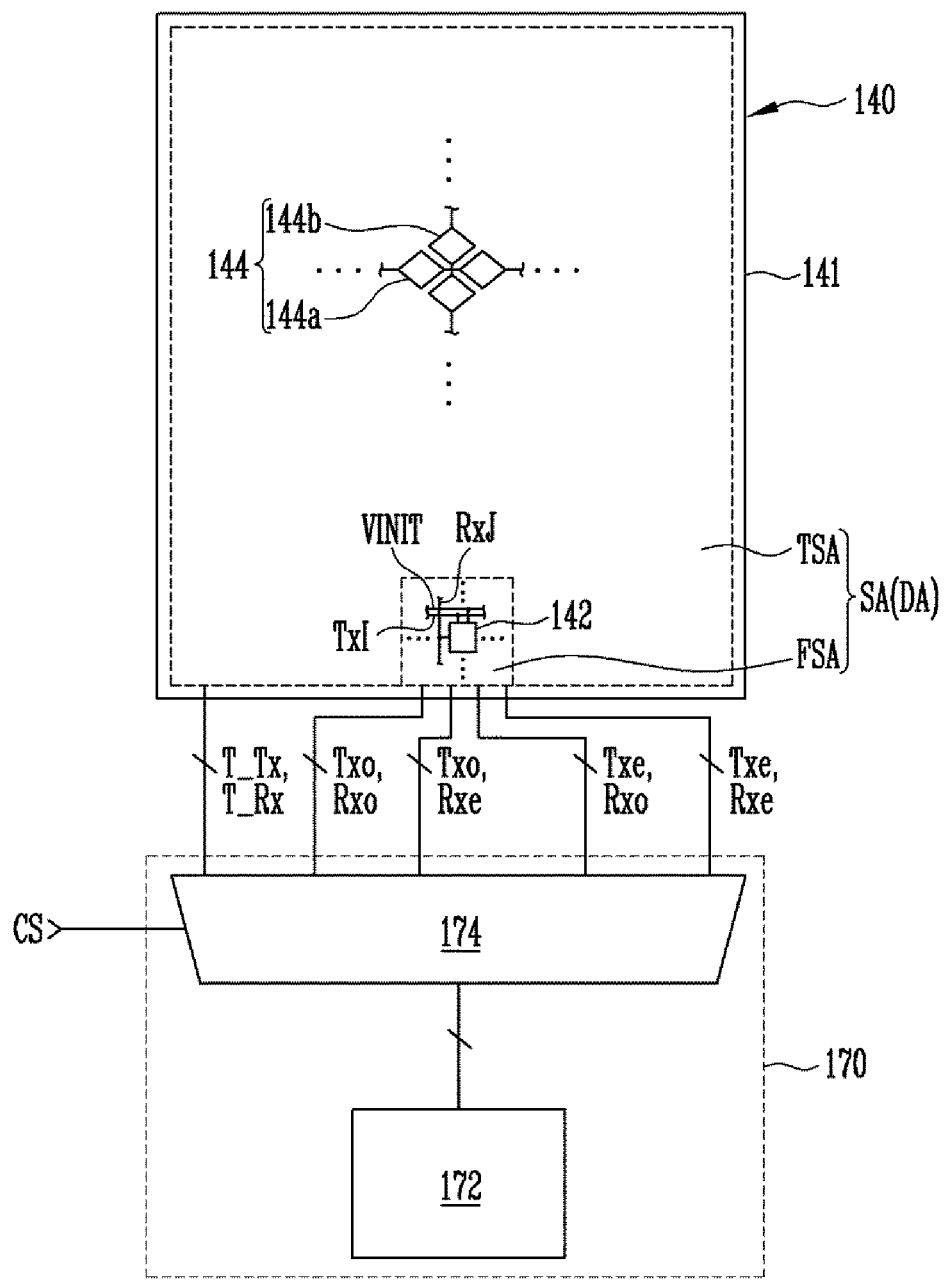

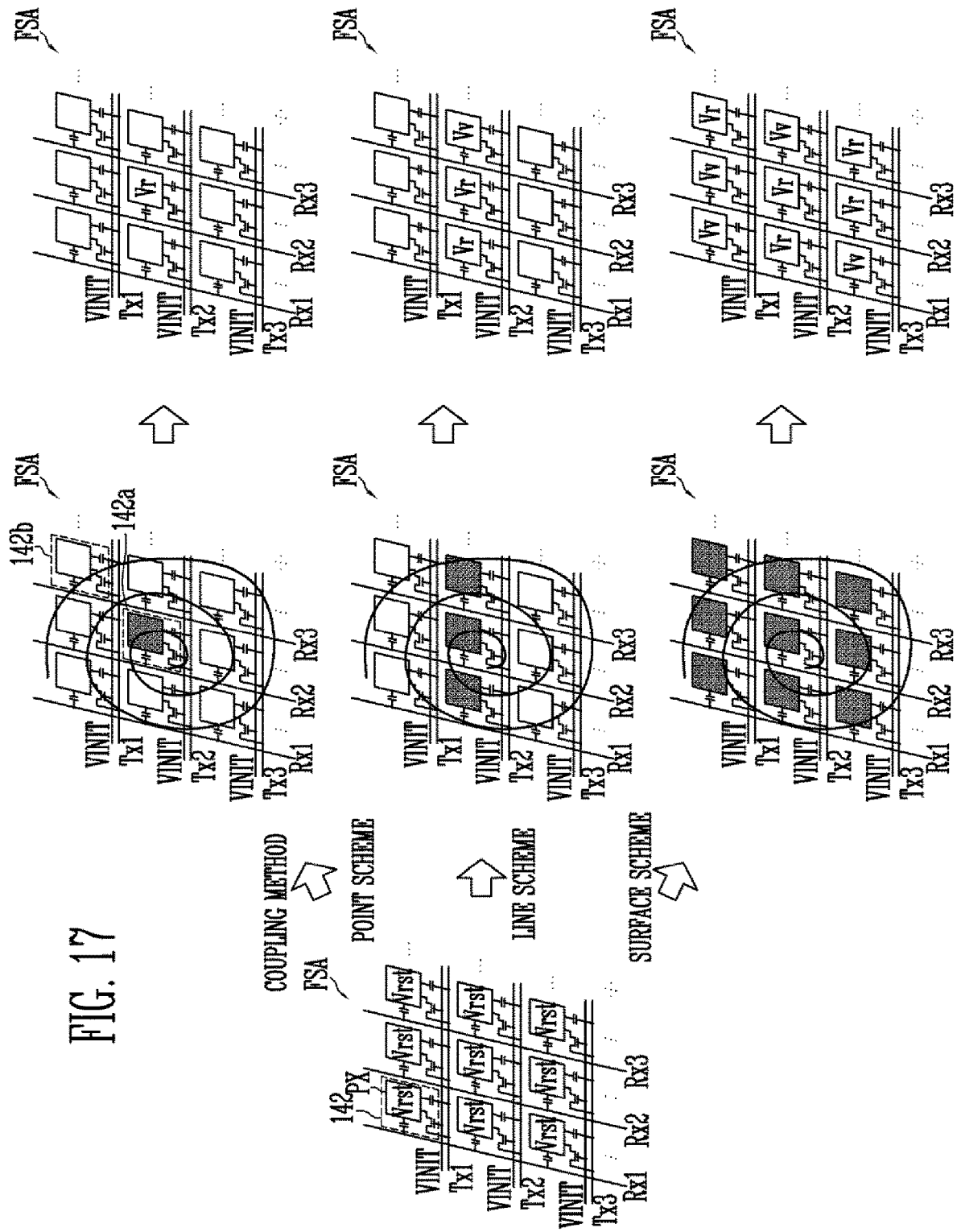

FINGERPRINT SENSOR AND DISPLAY DEVICE INCLUDING THE SAME

CROSS-REFERENCE TO RELATED APPLICATION

This application claims priority from and the benefit of Korean Patent Application No. 10-2017-0147916, filed on Nov. 8, 2017, which is hereby incorporated by reference for all purposes as if fully set forth herein.

BACKGROUND

Field

Exemplary embodiments of the invention relate generally to a fingerprint sensor and, more specifically, to a display device including the fingerprint sensor.

Discussion of the Background

Recently, display devices, such as a smartphone and a tablet PC, are used for various purposes. For example, display devices in electronic financial transactions are widely used to implement authentication methods using biometric information of users. An authentication method using the fingerprint of a user may be the most common method among various biometric authentication methods. As such, demands are rapidly growing for a fingerprint sensor and a display device including the fingerprint sensor.

The above information disclosed in this Background section is only for understanding of the background of the inventive concepts, and, therefore, it may contain information that does not constitute prior art.

SUMMARY

Exemplary embodiments of the invention provide a fingerprint sensor having high sensitivity, and a display device including the fingerprint sensor.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed A fingerprint sensor according to an exemplary embodiment includes first, second, and third lines, and a unit sensor coupled to the first, the second, and the third lines. The unit sensor includes a pixel electrode coupled between the first line and the second line, a first capacitance element coupled between the first line and the pixel electrode, a second capacitance element coupled between the second line and the pixel electrode, a switching element coupled between the pixel electrode and one of the first line, the second line, a first line of an adjacent unit sensor, and a second line of the adjacent unit sensor, and including a control electrode coupled to the third line, and a third capacitance element coupled between the third line and the pixel electrode, in which at least one of the first and the second capacitance elements includes a variable capacitance element.

The finger print sensor may further include a fourth line disposed around the unit sensor and configured to form a parasitic capacitance between the fourth line and the pixel electrode.

The fourth line may surround the pixel electrode.

The first and the second lines may extend in different directions to intersect with each other, and the pixel electrode may be disposed in a unit area defined by the first and the second lines.

The pixel electrode may have a circular shape.

At least one of the first and the second capacitance elements may include a metal insulator semiconductor (MIS) or metal insulator semiconductor metal (MISM) capacitance element.

The first line may be provided in plural, the second line may be provided in plural, and the unit sensor may be provided in plural, and the unit sensors may be disposed in respective unit areas corresponding to intersections between the first and the second lines.

The fingerprint sensor may further include a fourth line disposed between the unit sensors and configured to form a parasitic capacitance between the fourth line and the pixel electrode of each of the unit sensors.

The unit sensors may be simultaneously supplied with an initialization signal through the third line during an initialization period, and one of the first and second lines coupled to the switching element may be simultaneously supplied with a reset voltage during a period in which the initialization signal is supplied.

The fourth line may be supplied with the reset voltage during the period in which the initialization signal is supplied.

The first lines may be successively supplied with a driving signal during a sensing period following the initialization period, and a sensing signal may be output through the second lines during the sensing period.

The pixel electrode of each of the unit sensors may be disposed in an area between the first and the second lines.

The pixel electrode of each of the unit sensors may be disposed over an intersection between the first and the second lines such that the pixel electrode overlaps any one of the first and the second lines.

A display device according to an exemplary embodiment includes a display panel including display pixels disposed in a display area, and a fingerprint sensor. The fingerprint sensor includes a plurality of first and second lines and at least one third line disposed in a fingerprint sensing area overlapping the display area, and a plurality of unit sensors coupled to the first and the second lines and the third line. At least one of the unit sensors includes a pixel electrode coupled between predetermined first and second lines of the first and the second lines, a first capacitance element coupled between the predetermined first line and the pixel electrode, a second capacitance element coupled between the predetermined second line and the pixel electrode, a switching element coupled between the pixel electrode and one of the predetermined first line, the predetermined second line, a first line of an adjacent unit sensor, and a second line of the adjacent unit sensor, and including a control electrode coupled to the third line, and a third capacitance element coupled between the third line and the pixel electrode, in which at least one of the first and the second capacitance elements includes a variable capacitance element.

An entirety of the display area may be set as the fingerprint sensing area.

A portion of the display area may be set as the fingerprint sensing area, and another portion of the display area may be set as a touch sensing area.

The fingerprint sensing area and the touch sensing area may include a pixel electrode and a touch electrode disposed on a same sensor substrate.

The display device may further include a touch sensor provided around the fingerprint sensor and configured to overlap the display area, a sensor driving circuit configured to drive the touch sensor and the fingerprint sensor, and a selection circuit configured to selectively couple the touch sensor or the fingerprint sensor to the sensor driving circuit.

The selection circuit may be configured to simultaneously couple input/output lines of the touch sensor to the sensor driving circuit, in response to a first mode, and divide the first and the second lines into a plurality of groups and alternately couple first and second lines of each of the groups to the sensor driving circuit, in response to a second mode.

The display device may further include a fourth line disposed between the unit sensors and configured to form a parasitic capacitance between the fourth line and the pixel electrode of each of the unit sensors.

The unit sensors may be simultaneously supplied with an initialization signal through the third line during an initialization period, and first and second lines coupled to the switching element may be simultaneously supplied with a reset voltage during a period in which the initialization signal is supplied.

The fourth line may be supplied with the reset voltage during the period in which the initialization signal is supplied.

The first lines may be successively supplied with a driving signal during a sensing period following the initialization period, and a sensing signal may be output through the second lines during the sensing period.

The pixel electrode of each of the unit sensors may have a circular shape, and the fourth line may be spaced apart from the pixel electrode of each of the unit sensors by a predetermined distance and has a mesh shape in an area between the unit sensors.

The pixel electrode of each of the unit sensors may be disposed in an area between the first and the second lines.

The pixel electrode of each of the unit sensors may be disposed over an intersection between the first and the second lines such that the pixel electrode overlaps any one of the first and the second lines.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 6 is a diagram illustrating a sensor unit and a sensor circuit unit according to an exemplary embodiment of the invention.

FIG. 17 is a diagram illustrating a difference in occurrence of blurs between coupling methods.

DETAILED DESCRIPTION

Figure 1:
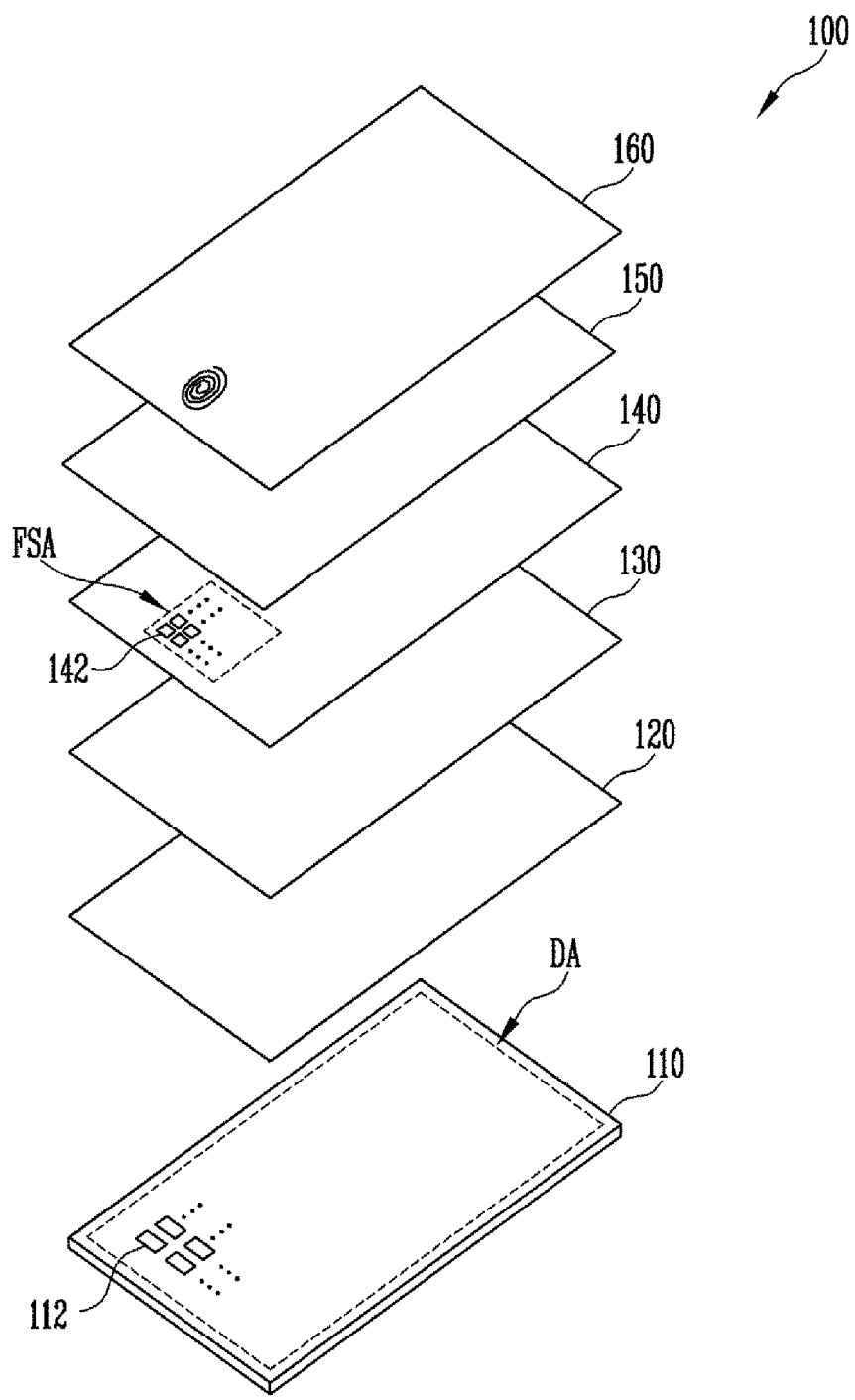
FIG. 1 is an exploded view of a display device according to an exemplary embodiment of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc.

(hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is an exploded view of a display device 100 according to an exemplary embodiment of the invention.

Referring to FIG. 1, the display device 100 includes a display panel 110 and a sensor unit 140 disposed on one surface of the display panel 110. Although FIG. 1 shows that the display panel 110 and the sensor unit 140 are separately-provided, the inventive concepts are not limited thereto. For example, according to an exemplary embodiment, the sensor unit 140 may be integrally formed with the display panel 110. In addition, while FIG. 1 shows that the sensor unit 140 is disposed over the display panel 110 (e.g., between the display panel 110 and a window 160), the inventive concepts are not limited thereto, and the location of the sensor unit 140 may be varied, such as under the display panel 110.

The display device 100 may further include a polarizing layer 120 and the window 160 that are disposed on an image display surface (e.g., a front surface) side of the display panel 110. For example, the polarizing layer 120 may be disposed between the display panel 110 and the sensor unit 140, and the window 160 may be disposed on the uppermost layer of the display device 100. In an exemplary embodiment, at least one of the polarizing layer 120 and the window 160 may be omitted or integrally formed with the display panel 110 and/or the sensor unit 140.

The display device 100 may further include a first adhesive layer 130 disposed between the display panel 110 and the sensor unit 140, and a second adhesive layer 150 disposed between the sensor unit 140 and the window 160. The first and second adhesive layers 130 and 150 may be substantially transparent to pass light therethrough, and the material thereof is not specifically limited. In an exemplary embodiment, at least one of the first and second adhesive layers 130 and 150 may be omitted. For example, when the sensor unit 140 is integrally formed with the display panel 110, the polarizing layer 120, and/or the window 160, and at least one of the first and second adhesive layers 130 and 150 may be omitted.

The display panel 110 includes a plurality of display pixels 112 disposed in a display area DA. The display panel 110 may be coupled to a display driver and driven by the display driver. The display panel 110 may have various structures and be driven in various methods well known in the art.

The sensor unit 140 may include a fingerprint sensing area FSA. In an exemplary embodiment, the fingerprint sensing area FSA may overlap the display area DA. For example, a portion of the display area DA may be set as the fingerprint sensing area FSA.

The sensor unit 140 may further include a plurality of unit sensors 142 disposed in the fingerprint sensing area FSA. A group of unit sensors 142 forms a fingerprint sensor (e.g., a sensor unit of the fingerprint sensor). The unit sensors 142 may be image pixels of the fingerprint sensor for reading an image.

The shape, size, number, resolution, and/or arrangement structure of unit sensors 142 provided in the fingerprint sensing area FSA is not limited. However, the unit sensors 142 may be distributed in the fingerprint sensing area FSA and have a fine size and a high resolution to sense the fingerprint of the user. Furthermore, the unit sensors 142 may be regularly arranged in the fingerprint sensing area FSA, but the inventive concepts are not limited thereto. In an embodiment, the unit sensors 142 may be irregularly arranged on the fingerprint sensing area FSA. Alternatively, the fingerprint sensing area FSA may be divided into a plurality of areas, and the unit sensors 142 may be disposed on divided areas with different densities.

The display device 100 according to an exemplary embodiment may sense the fingerprint of the user in the fingerprint sensing area FSA using the fingerprint sensor formed of the unit sensors 142. For example, each of the unit sensors 142 may include a pixel electrode configured to form a contact capacitance with a contact means, such as the finger of the user, in response to a touch event. Using the unit sensors 142, the display device 100 may sense the shape of a fingerprint by sensing the capacitance between the pixel electrodes and the finger, which may vary depending on the shape of the fingerprint (e.g., the pattern formed by ridges and valleys of the fingerprint).

Figure 2:
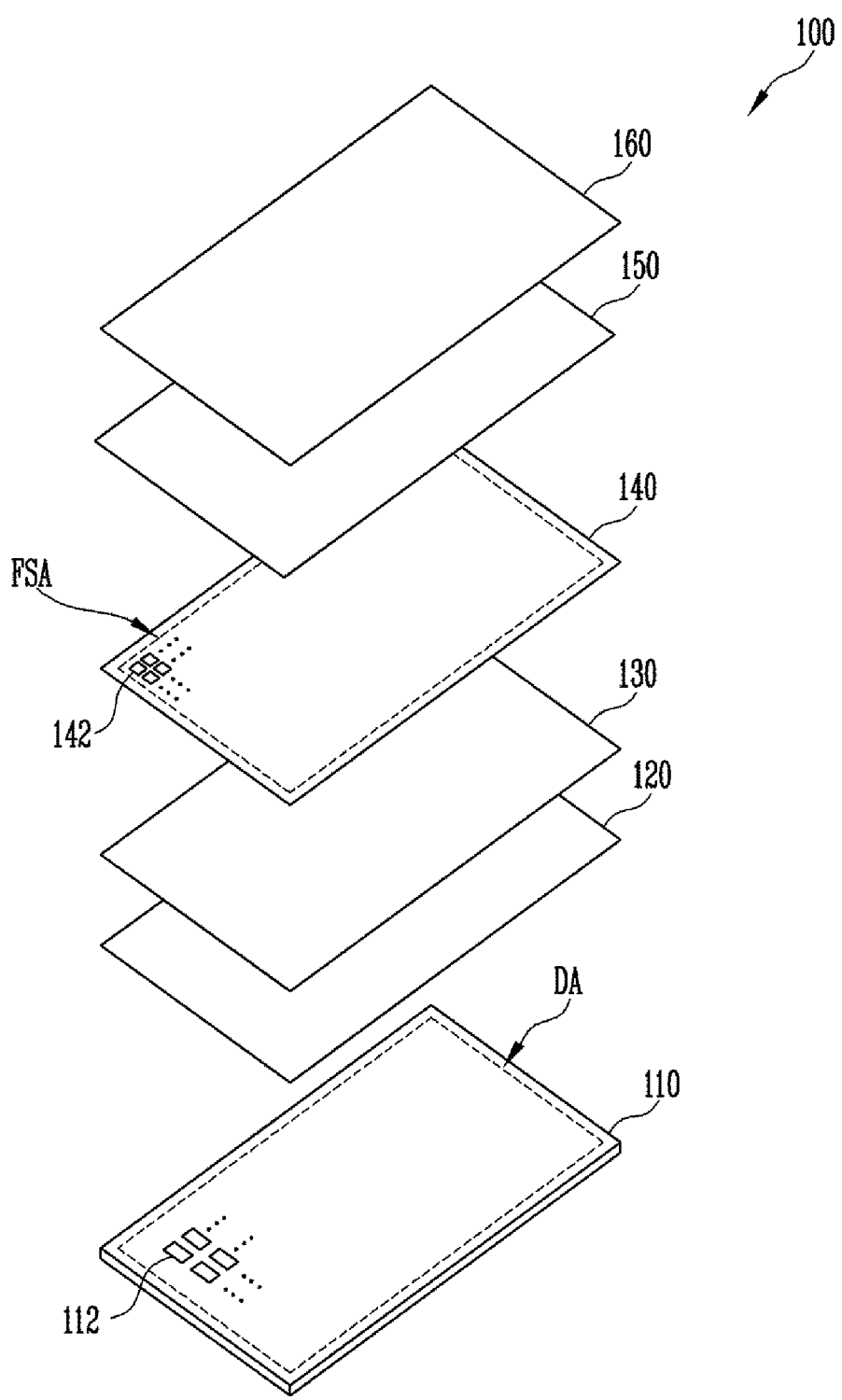
FIG. 2 is an exploded view of a display device according to an exemplary embodiment of the invention.
Figure 3:
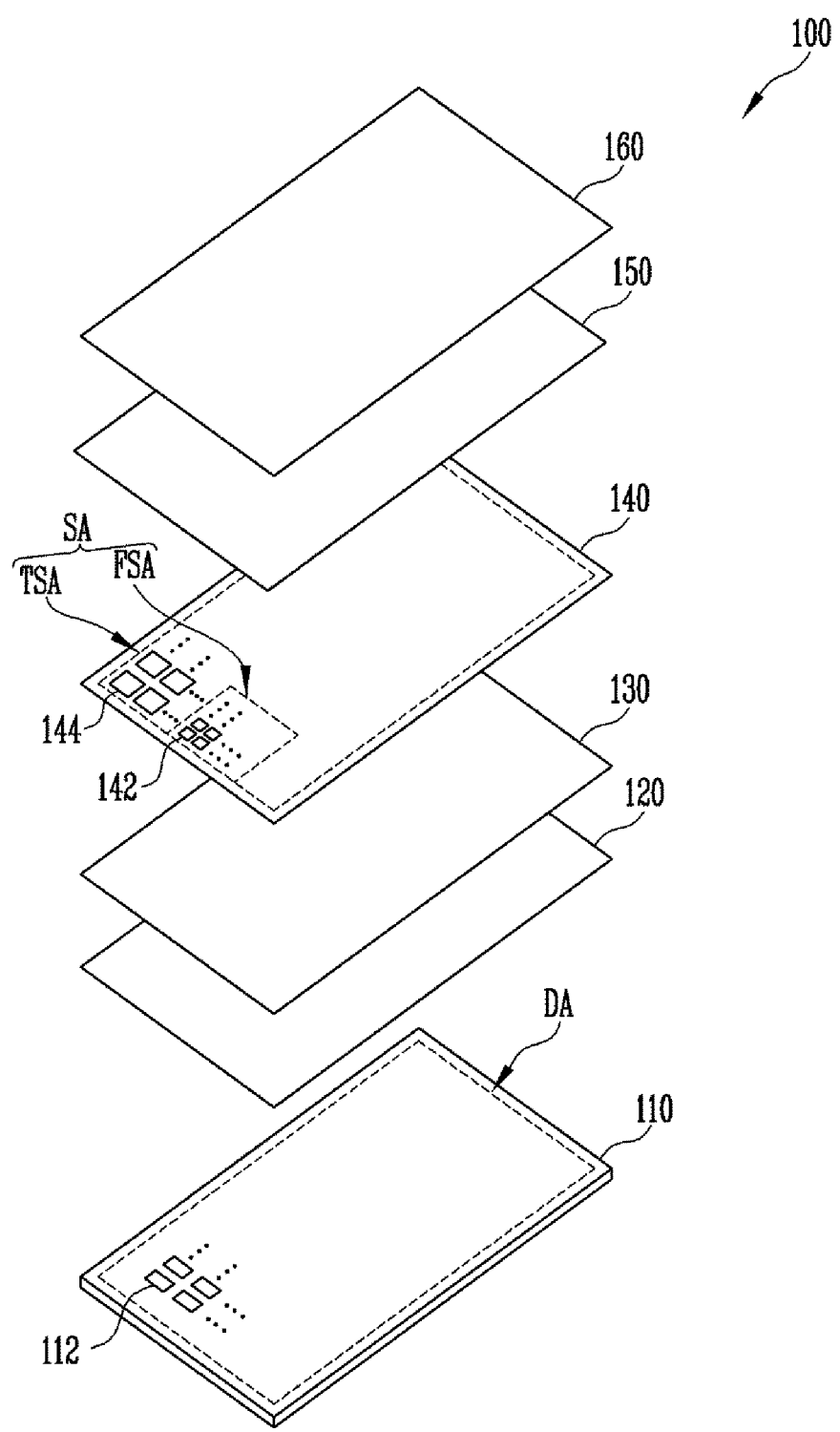
FIG. 3 is an exploded view of a display device according to an exemplary embodiment of the invention.

FIGS. 2 and 3 are exploded views of display devices according to exemplary embodiments. In FIGS. 2 and 3, like reference numerals are used to designate the same or similar elements as those in FIG. 1, and thus, repeated descriptions thereof will be omitted to avoid redundancy.

Referring to FIG. 2, the entire display area DA may be set as a fingerprint sensing area FSA. For example, the display area DA and the fingerprint sensing area FSA may substantially have the same size (or area) and completely overlap each other. In this case, the unit sensors 142 may be distributed on the entire surface of the display area DA.

Referring to FIG. 3, a portion of the display area DA may be set as a fingerprint sensing area FSA, and another portion of the display area DA may be set as a touch sensing area TSA. For example, the entire display area DA other than the fingerprint sensing area FSA may be set as the touch sensing area TSA. Alternatively, the touch sensing area TSA and the fingerprint sensing area FSA may overlap each other. In this case, the sensor unit 140 may be formed of a fingerprint and touch sensor unit capable of sensing both a fingerprint and a touch. The sensing area SA of the sensor unit 140 may include the fingerprint sensing area FSA and the touch sensing area TSA.

In an exemplary embodiment, a plurality of touch electrodes 144 may be disposed in the touch sensing area TSA. A group of touch electrodes 144 may form a touch sensor (e.g., a sensor unit of the touch sensor). The touch sensor may have various structure and be driven in various methods well know in the art. For example, the touch sensor may be a self capacitance sensor or a mutual capacitance sensor. More particularly, the touch electrodes 144 may be formed of self-capacitance electrodes, which form capacitances with a contact means, such as the finger of the user, in response to a touch event, or driving electrodes and sensing electrodes extending in different directions and/or connect with each other to form mutual capacitances.

The shape, size, number, resolution, and/or arrangement structure of touch electrodes 144 provided in the touch sensing area TSA is not specifically limited. However, the touch electrodes 144 distributed in the touch sensing area TSA may have a size and a resolution capable of sensing a touch input. For example, the touch electrodes 144 distributed in the touch sensing area TSA may each have a size greater than that of the individual unit sensor 142 of the fingerprint sensor, and may have a resolution lower than that of the unit sensors 142.

Figure 4:
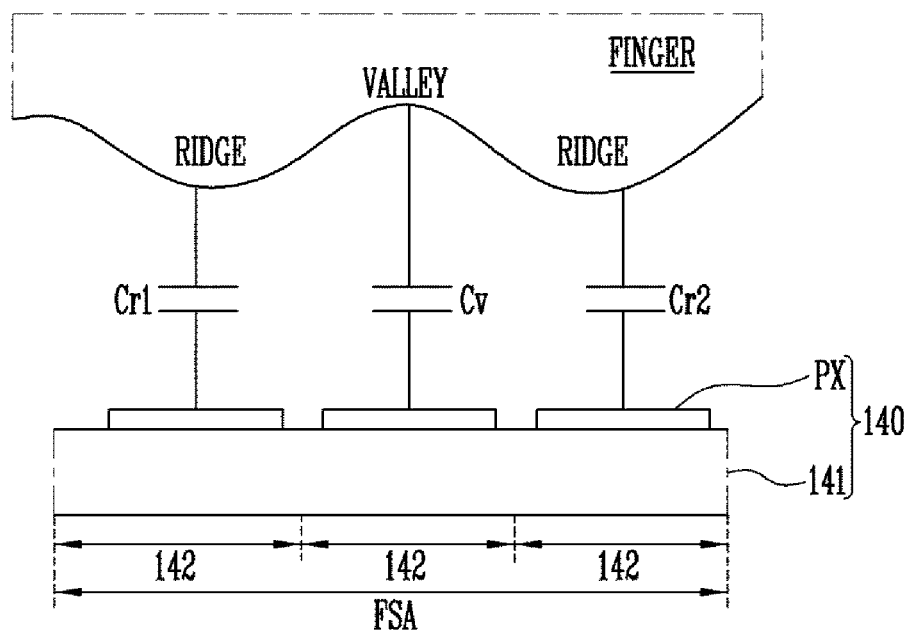
FIG. 4 is a schematic diagram illustrating the principles of a fingerprint sensor according to an exemplary embodiment of the invention.

FIG. 4 is a schematic diagram illustrating the principles of a fingerprint sensor according to an exemplary embodiment of the invention.

Referring to FIG. 4, the sensor unit 140 may include a sensor substrate 141, and a plurality of pixel electrodes PX provided on the sensor substrate 141. Each of the pixel electrodes PX may be disposed in a corresponding unit sensor area 142.

In an exemplary embodiment, the sensor substrate 141 may be substantially transparent. For example, when the sensor unit 140 is disposed over the front surface (at the image display surface side) of the display panel 110, the sensor substrate 141 may include transparent or semi-transparent material having a predetermined light transmittance range. In an exemplary embodiment, the sensor substrate 141 may be a thin-film substrate including materials, such as glass or plastic, however, the material or the thickness range thereof is not limited. For example, the sensor substrate 141 may include various materials, e.g., a transparent thin-film substrate made of plastic, such as polyethylene terephthalate (PET), a transparent or colored polyimide (PI) substrate, and a glass substrate.

In an exemplary embodiment, the sensor substrate 141 may be provided separately from the display panel 110, or be at least one substrate and/or insulating layer of the display panel 110. For example, the sensor substrate 141 may be a separate substrate from the display panel 110 and to which the sensors are disposed, or an upper substrate or thin-film encapsulation layer of the display panel 110.

In an exemplary embodiment, the pixel electrodes PX may be substantially transparent. For example, the pixel electrodes PX may include transparent or semi-transparent material having a predetermined light transmittance range, or has a structure capable of having the light transmittance conditions.

For example, the pixel electrodes PX may include at least one of metal, transparent conductive material, and other various conductive materials, thus having a predetermined conductivity. When the pixel electrodes PX include opaque material, the thickness of the pixel electrodes PX may be limited or the pixel electrodes PX may be formed in a mesh shape to secure the light transmittance thereof. Furthermore, each of the pixel electrodes PX may have a single layer structure or a multilayer structure. For example, each of the pixel electrodes PX may have a double-layer structure including a planar electrode formed of transparent material, and a mesh-shaped metal electrode overlapping the planar electrode. As described above, the material, thickness, structure, etc. of the pixel electrodes PX may be variously modified.

The pixel electrodes PX may include at least one of various metals including gold (Au), silver (Ag), aluminum (Al), molybdenum (Mo), chrome (Cr), titanium (Ti), nickel (Ni), neodymium (Nd), copper (Cu), platinum (Pt), etc., or an alloy thereof. Alternatively, the pixel electrodes PX may include a transparent conductive material, such as silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), a carbon nanotube, and grapheme, etc. In addition, the pixel electrodes PX may include at least one of various conductive materials.

When the finger (particularly, a fingerprint region) of the user contacts the fingerprint sensing area FSA of the sensor unit 140, each of the pixel electrodes PX in the corresponding area forms a capacitance Cr1, Cv, Cr2 with the finger. The capacitances Cr1, Cv, and Cr2 may be formed between the pixel electrodes PX and the finger, and the magnitude of the capacitances Cr1, Cv, and Cr2 may be different from each other depending on the shape (or a pattern) of the fingerprint of the user.

In detail, when a ridge of the fingerprint contacts the fingerprint sensing area FSA, the distance between the pixel electrode PX and the finger is relatively small as compared to when a valley of the fingerprint contacts the fingerprint sensing area FSA. Therefore, in the areas corresponding to the valley and the ridge of the fingerprint, the capacitances Cr1, Cv, and Cr2 having different magnitudes are formed between the pixel electrodes PX and the finger. For example, the size of the capacitance Cr1 or Cr2 formed between the pixel electrode PX and the ridge of the fingerprint may be greater than that of the capacitance Cv formed between the pixel electrode PX and the valley of the fingerprint. As such, the shape of the fingerprint may be sensed by determining deviations between the capacitances Cr1, Cv, and Cr2.

To detect the deviations between the capacitances Cr1, Cv, and Cr2, a current sensing type fingerprint sensor may be generally used, which includes a transistor coupled to each pixel electrode PX and configured to send a current corresponding to the level of a voltage applied to the pixel electrode PX, and thus uses I-V (current-voltage) characteristics of the transistor. For example, the deviations between the capacitances Cr1, Cv, and Cr2 formed on the respective unit sensors 142 may be determined by sensing driving current flowing through the transistor and calculating a voltage corresponding to the driving current.

However, in the conventional current sensing scheme, a current deviation may be generated depending on a characteristic deviation of the transistor. The characteristics of the transistor may be varied depending on the temperature, external light, and/or deterioration, which may reduce the reliability of the fingerprint sensor.

A fingerprint sensor according to an exemplary embodiment of the invention may have an improved structure and use a scheme capable of sensing the shape of the fingerprint using C-V (capacitance-voltage) characteristics based on deviations between the capacitances Cr1, Cv, and Cr2 formed between the pixel electrodes PX and the finger. By using the C-V characteristics, variation in the characteristics of the transistor depending on a characteristic deviation, the temperature and/or external light may be substantially reduced. For example, even when environmental conditions such as the temperature or external light change, the values of the minimum capacitance Cmin and the maximum capacitance Cmax may remain constant, and only the inclination and/or the shape of a curve in a transition section may be changed. As such, the reliability of the fingerprint sensor may be improved. The structure of the fingerprint sensor and the method of driving the fingerprint sensor according to exemplary embodiments will be described in detail.

Figure 5:
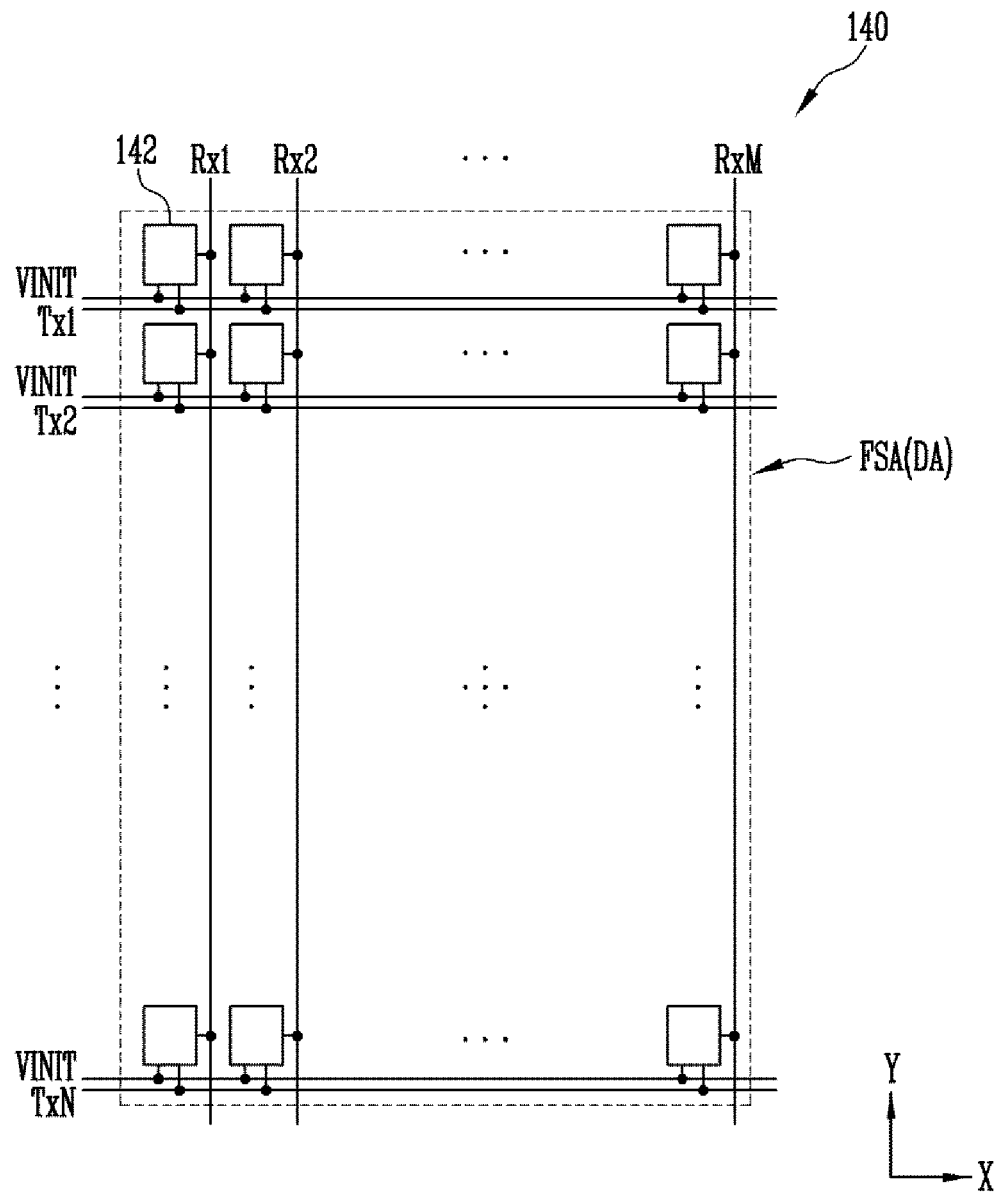
FIG. 5 is a diagram illustrating a fingerprint sensing area of a sensor unit according to an exemplary embodiment of the invention.

FIG. 5 is a diagram illustrating the fingerprint sensing area FSA of the sensor unit 140 according to an exemplary embodiment of the invention.

Referring to FIG. 5, a plurality of driving lines (first lines) Tx1 to TxN (N is a natural number of 2 or more), sensing lines (second lines) Rx1 to RxM (M is a natural number of 2 or more), and at least one initialization signal line (third line) VINIT may be disposed in the fingerprint sensing area FSA. The unit sensors 142 may be disposed in respective unit areas corresponding to intersections between the driving lines Tx1 to TxN and the sensing lines Rx1 to RxM. For example, the unit sensors 142 coupled to the driving lines Tx1 to TxN, the sensing lines Rx1 to RxM, and the initialization signal line VINIT may be provided in the respective unit areas that are defined by the driving lines Tx1 to TxN and the sensing lines Rx1 to RxM. The driving lines Tx1 to TxN, the sensing lines Rx1 to RxM, the initialization signal line VINIT, and the unit sensors 142 may form the sensor unit (e.g., the fingerprint sensing area FSA) of the fingerprint sensor.

The driving lines Tx1 to TxN may be disposed on the fingerprint sensing area FSA and extend in a first direction. For example, the driving lines Tx1 to TxN may be disposed on respective rows and extend in an X-axis direction. During a predetermined sensing period, the driving lines Tx1 to TxN may successively receive a driving signal from a sensor driving circuit and successively transmit the driving signal to the unit sensors 142 provided on the respective rows.

The sensing lines Rx1 to RxM may be disposed on the fingerprint sensing area FSA and intersect the driving lines Tx1 to TxN, respectively. For example, the sensing lines Rx1 to RxM may be disposed on respective columns and extend in a second direction, e.g., a Y-axis direction, intersecting the first direction. During a predetermined sensing period, the sensing lines Rx1 to RxM may receive sensing signals corresponding to the driving signal from the unit sensors 142 and transmit the sensing signals to the sensor driving circuit. In response to receiving the sensing signals, the sensor driving circuit may sense the shape of the fingerprint based on the sensing signals.

In an exemplary embodiment, during a predetermined initialization period, the driving lines Tx1 to TxN or the sensing lines Rx1 to RxM may simultaneously receive a reset voltage and transmit the reset voltage to the unit sensors 142. For example, the driving lines Tx1 to TxN or the sensing lines Rx1 to RxM may be coupled to the switching elements of the unit sensors 142 to transmit the reset voltage to the switching elements during an initialization period, in which the switching elements are turned on.

The initialization signal line VINIT may supply an initialization signal to the unit sensors 142 during a predetermined initialization period. FIG. 5 shows a plurality of initialization signal lines VINIT disposed on the fingerprint sensing area FSA, which correspond to each horizontal row of the fingerprint sensor, but the inventive concepts are not limited thereto. For example, the initialization signal lines VINIT may simultaneously supply the initialization signal to the unit sensors 142 during a predetermined initialization period and may be integrated into a single line inside and/or outside the fingerprint sensing area FSA. In this case, the initial signal lines VINIT may be formed as a single mesh line.

The driving lines Tx1 to TxN, the sensing lines Rx1 to RxM, the initialization signal line VINIT, and the unit sensors 142 may form the sensor unit 140 of the fingerprint sensor. In an exemplary embodiment, the sensor unit 140 may be disposed on the entire surface of the display area DA, thus forming an entire-surface fingerprint sensor. In this case, a fingerprint may be sensed over the entire area of the display area DA. Furthermore, the fingerprint sensor according to an exemplary embodiment may be configured to detect a difference in capacitance in response to a touch input. Hence, the fingerprint sensor may be used as a touch sensor. In particular, a touch input and/or a fingerprint may be detected over the entire area of the display area DA.

FIG. 6 is a diagram illustrating the sensor unit 140 and a sensor circuit unit according to an exemplary embodiment of the invention. In an exemplary embodiment, the sensor unit 140 and the sensor circuit unit of FIG. 6 may be provided in the display device.

Referring to FIG. 6, the sensor unit 140 according to an exemplary embodiment may include a sensing area SA including a fingerprint sensing area FSA and a touch sensing area TSA. In an exemplary embodiment, the touch sensing area TSA may be disposed around the fingerprint sensing area FSA, such that the touch sensing area TSA does not overlap the fingerprint sensing area FSA. In particular, the sensor unit 140 may include a fingerprint sensor provided in the fingerprint sensing area FSA, and a touch sensor provided around the fingerprint sensor and configured to overlap the display area DA. However, the inventive concepts are not limited thereto, and the touch sensing area TSA and the fingerprint sensing area FSA may at least partially overlap each other or be set as the same area.

The fingerprint sensing area FSA may include a plurality of unit sensors 142 each coupled to a corresponding driving line TxI (I is a natural number of N or less), a corresponding sensing line RxJ (J is a natural number of M or less), and the initialization signal line VINIT. For example, a unit sensor 142 disposed on an I-th row and a J-th column in the fingerprint sensing area FSA may be coupled to at least the I-th driving line TxI, the J-th sensing line RxJ, and the initialization signal line VINIT.

The touch sensing area TSA may include a plurality of touch electrodes 144. For example, the touch sensing area TSA may include a plurality of first touch electrodes 144*a* extending in the first direction, and a plurality of second touch electrodes 144*b* extending in the second direction. In an exemplary embodiment, the first touch electrodes 144*a* and the second touch electrodes 144*b* may be mutual capacitance driving electrodes and mutual capacitance sensing electrodes, respectively. For example, the first touch electrodes 144*a* may be coupled to driving lines T_Tx for touch sensing, and the second touch electrodes 144*b* may be coupled to sensing lines T_Rx for touch sensing. However, the inventive concepts are not limited thereto, and the structure of the touch sensing area TSA may be changed in various ways.

In an exemplary embodiment, the unit sensors 142 for detecting a fingerprint and the touch electrodes 144 for detecting a touch input may be formed on the same sensor substrate 141. For example, the pixel electrodes PX of the unit sensor 142 and the touch electrodes 144 may be formed on the same surface of the sensor substrate 141 and be spaced apart from each other through the same process.

The sensor unit 140 may be coupled to the sensor circuit unit 170 through driving lines T_Tx, Txo, and Txe, and sensing lines T_Rx, Rxo, and Rxe. The sensor circuit unit 170 may include at least a sensor driving circuit 172 and drive the sensor unit 140 using the sensor driving circuit 172. The initialization signal line VINIT may be directly or indirectly coupled to the sensor driving circuit 172, or coupled to another power source circuit, etc.

In an exemplary embodiment, the touch sensor and the fingerprint sensor may be implemented by the sensors operating in the same scheme and/or principle. For example, both the touch sensor and the fingerprint sensor may use sensors configured to detect a touch input or a fingerprint in a mutual capacitance scheme during at least a sensing period.

In this case, the single sensor driving circuit 172 may be used to drive both the touch sensor and the fingerprint sensor. For example, the sensor driving circuit 172 may include a sensing circuit, which may sense a variation in capacitance using a voltage to be input to each Rx channel. As another example, the sensor driving circuit 172 may include a plurality of sensing channels (Rx channels) each including an analog front end (AFE) configured of an integrator.

In an exemplary embodiment, the sensor circuit unit 170 may further include a selection circuit 174 coupled between the sensor unit 140 and the sensor driving circuit 172. The selection circuit 174 may selectively couple either the touch sensor or the fingerprint sensor (e.g., the sensor unit of the touch sensor or the fingerprint sensor) to the sensor driving circuit 172 in response to a control signal CS. For example, the selection circuit 174 may couple the touch electrodes 144 of the touch sensor to the sensor driving circuit 172 in response to receiving a control signal CS corresponding to a touch sensing mode (first mode), and couple the unit sensors 142 of the fingerprint sensor to the sensor driving circuit 172 in response to a control signal CS corresponding to a fingerprint sensing mode (second mode).

In an exemplary embodiment, between the selection circuit 174 and the sensor driving circuit 172, the sensor unit 140 may further include input/output channels corresponding to the number of input/output lines of any one of the touch sensor and the fingerprint sensor that has a less number of input/output lines (e.g., driving lines T_Tx, Txo, and Txe and sensing lines T_Rx, Rxo, and Rxe).

For example, when the touch sensor has P (P is a natural number) driving lines (input lines) T_Tx, and Q (Q is a natural number) sensing lines (output lines) T_Rx, and the sensing sensor has N driving lines Tx1 to TxN (N is 2P) and M sensing lines Rx1 to RxM (M is 2Q), the numbers of which respectively correspond to 2P and 2Q, and when a control signal CS corresponding to the touch sensing mode is supplied, the selection circuit 174 may simultaneously couple the driving lines T_Tx and the sensing lines T_Rx of the touch sensor to the sensor driving circuit 172. Furthermore, when a sensing signal CS corresponding to the fingerprint sensing mode is supplied, the selection circuit 174 may divide the driving lines Txo and Txe and the sensing lines Rxo and Rxe of the fingerprint sensor into a plurality of groups, and alternately couple the driving lines Txo and Txe and the sensing lines Rxo and Rxe of each group to the sensor driving circuit 172.

For example, when the sensing signal CS corresponding to the fingerprint sensing mode is supplied, the fingerprint sensor may be driven in a time-sharing scheme, in which the selection circuit 174 divides the driving lines Txo and Txe and the sensing lines Rxo and Rxe of the fingerprint sensor into a plurality of groups, and alternately couples the driving lines Txo and Txe and the sensing lines Rxo and Rxe of each group to the sensor driving circuit 172. For example, the selection circuit 174 may divide the driving lines Txo and Txe and the sensing lines Rxo and Rxe into groups of odd-number and even-number lines Txo, Txe, Rxo, and Rxe, and alternately couple their combinations (e.g., the odd-number driving lines Txo and the odd-number sensing lines Rxo, the odd-number driving lines Txo and the even-number sensing lines Rxe, the even-number driving lines Txe and the odd-number sensing lines Rxo, the even-number driving lines Txe and the even-number sensing lines Rxe) to the sensor driving circuit 172. In this case, the selection circuit 174 may be implemented as a 1:5 demultiplexer.

As described above, a touch driving circuit and a fingerprint driving circuit for driving the touch sensor and the finger sensor according to an exemplary embodiment may be formed into a single integrated sensor driving circuit 172. Furthermore, since the operating mode of the selection circuit 174 is controlled (or converted) using a control signal CS, the number of input/output channels of the sensor driving circuit 172 may be reduced, and the touch driving circuit may also be used as the fingerprint driving circuit. In addition, at least some of the unit sensors 142 of the fingerprint sensing area FSA may be operated even in the touch sensing mode, and thus, a touch input may also be sensed on the fingerprint sensing area FSA. Therefore, the existing touch driving circuit may also be used as the fingerprint driving circuit, so that the structure of the sensor circuit unit 170 may be simplified, and the production cost may be reduced.

FIGS. 7A, 7B, 8, and 9 are diagrams illustrating a unit sensor 142 according to exemplary embodiments of the invention. According to an exemplary embodiment, the structure of each unit sensor 142 shown in FIGS. 7A to 9 may be applied to at least one of the unit sensors 142 forming the fingerprint sensor. For example, the unit sensors 142 may have substantially the same structure.

Figure 7A:
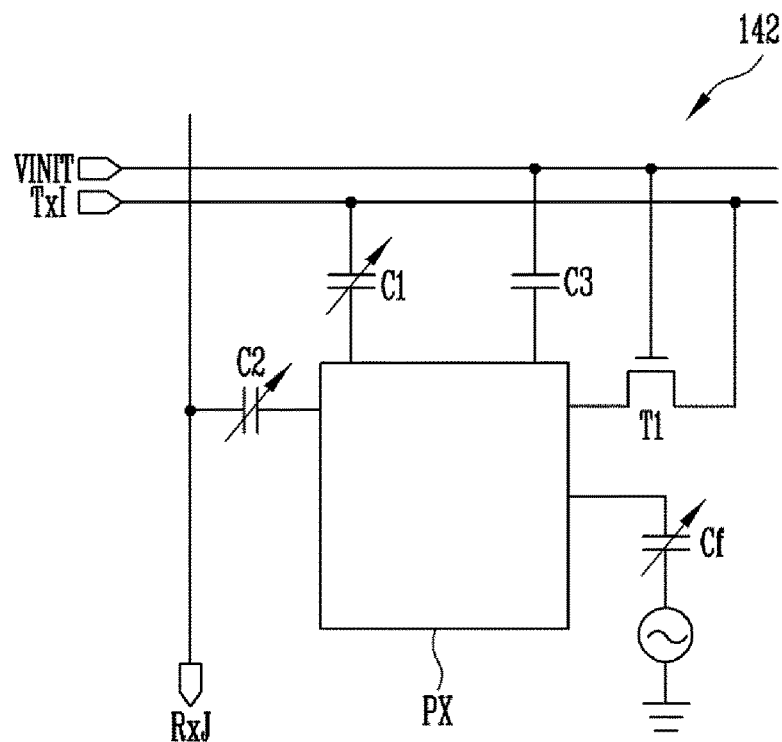
FIGS. 7A and 7B are diagrams illustrating unit sensors according to exemplary embodiments of the invention.

Referring to FIGS. 7A to 9, at least one driving line TxI, at least one sensing line RxJ, and the initialization signal line VINIT may be disposed around each unit sensor 142. Each unit sensor 142 may be coupled to the corresponding driving line TxI, the corresponding sensing line RxJ, and the initialization signal line VINIT. In an exemplary embodiment, as shown in FIGS. 7B to 9, a common power source line (fourth line) VCOM may be further disposed around the unit sensor 142. The common power source line VCOM may be an optional component. For example, as shown in FIG. 7A, the common power source line VCOM may be omitted.

Each unit sensor 142 may include a pixel electrode PX, a switching element T1, a first capacitance element C1, a second capacitance element C2, and a third capacitance element C3.

The pixel electrode PX may be coupled between the corresponding driving line TxI and the corresponding sensing line RxJ. In response to a contact by a contact means, such as the finger of the user, the pixel electrode PX may form a contact capacitance Cf with the contact means. The magnitude of the contact capacitance Cf may be varied depending on the distance between the pixel electrode PX and the contact means.

The switching element T1 may be coupled between the driving line TxI and the pixel electrode PX. A control electrode of the switching element T1 may be coupled to the initialization signal line VINIT. For example, the switching element T1 may be coupled between the driving line TxI and the pixel electrode PX, and implemented by a transistor element having a gate electrode coupled to the initialization signal line VINIT. The switching element T1 may be turned on in response to a gate-on voltage supplied from the initialization signal line VINIT during a predetermined initialization period, and transmit a reset voltage supplied to the driving line TxI to the pixel electrode PX during the initialization period. The switching element T1 may be turned off in response to a gate-off voltage supplied from the initialization signal line VINIT during the remaining period other than the initialization period (e.g., during the remaining period other than the initialization period of the period during which the touch sensing mode is performed). As such, the pixel electrode PX may be floated during the remaining period other than the initialization period.

The first capacitance element C1 may be coupled between the driving line TxI and the pixel electrode PX. The second capacitance element C2 may be coupled between the sensing line RxJ and the pixel electrode PX. More particularly, the first and second capacitance elements C1 and C2 may be provided with the pixel electrode PX interposed therebetween, and be coupled between the corresponding driving line TxI and the corresponding sensing line RxJ.

Figure 7B:
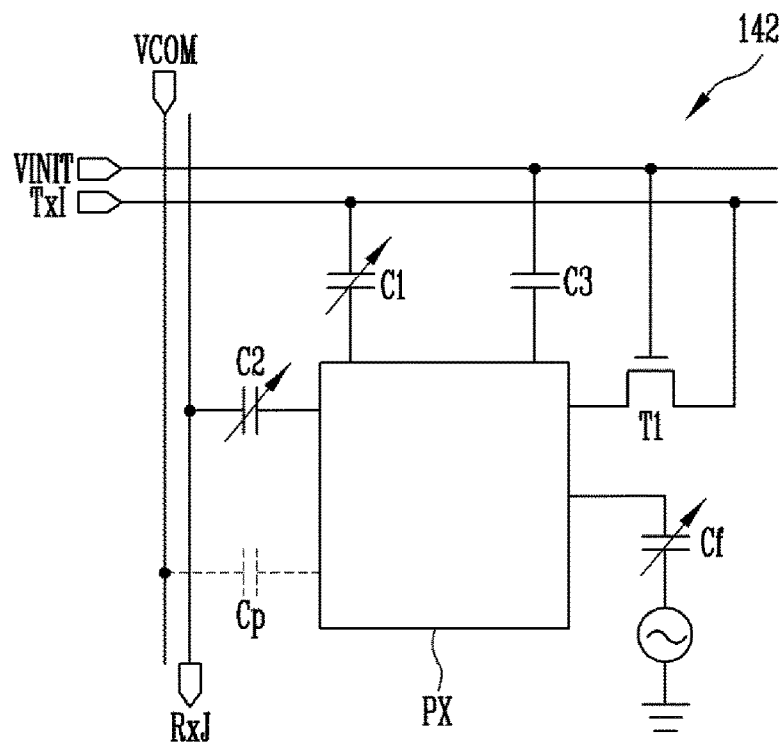
Figure 8:
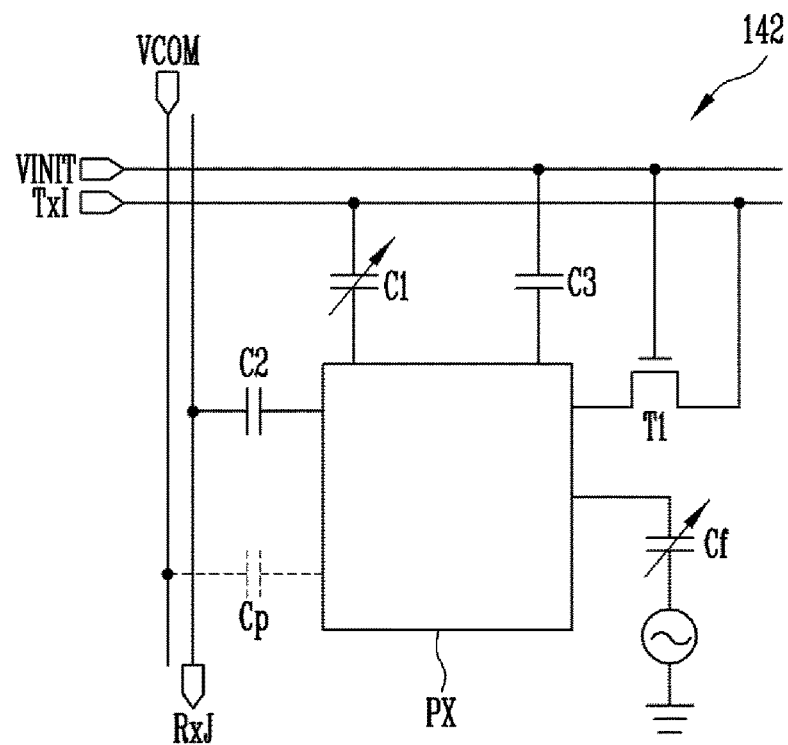
FIG. 8 is a diagram illustrating a unit sensor according to an exemplary embodiment of the invention.
Figure 9:
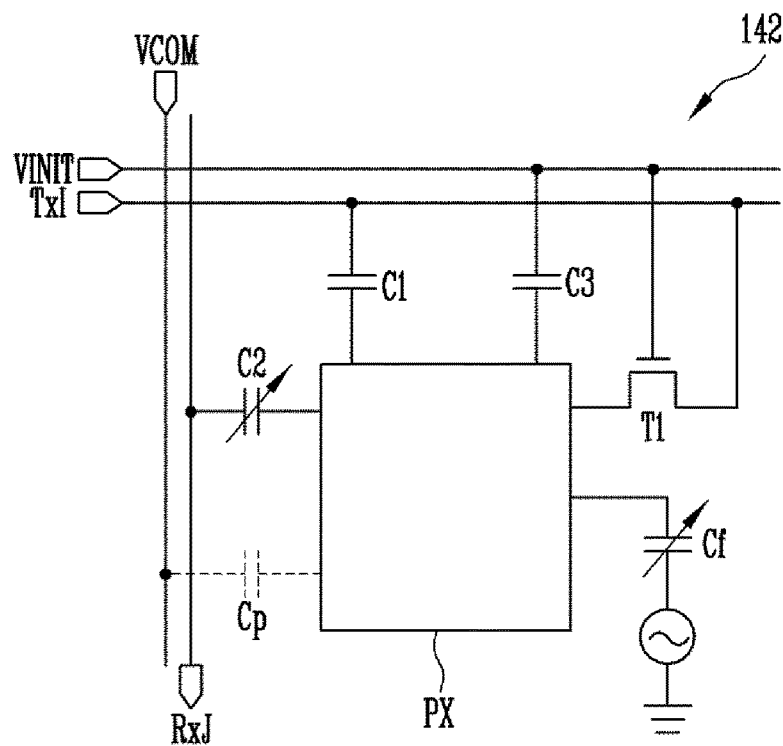
FIG. 9 is a diagram illustrating a unit sensor according to an exemplary embodiment of the invention.

In an exemplary embodiment, at least one of the first and second capacitance elements C1 and C2 may include a variable capacitance element, the capacitance of which varies depending on a voltage applied thereto. For example, at least one of the first and second capacitance elements C1 and C2 may be a metal insulator semiconductor (MIS) or metal insulator semiconductor metal (MISM) capacitance element. For example, as shown in FIGS. 7A and 7B, both the first and second capacitance elements C1 and C2 may be formed of variable capacitance elements. Alternatively, as shown in FIG. 8, only the first capacitance element C1 may be formed of a variable capacitance element. As a further alternative, only the second capacitance element C2 may be formed of a variable capacitance element, as shown in FIG. 9.

The third capacitance element C3 may be coupled between the initialization signal line VINIT and the pixel electrode PX. In an exemplary embodiment, the third capacitance element C3 may be formed of a fixed capacitance element, which has a constant capacitance regardless of a voltage applied thereto. In this case, due to the third capacitance element C3, a sufficient amount of voltage change in the pixel electrode PX during a coupling operation may be secured.

The common power source line VCOM may be disposed between the unit sensors 142 of the fingerprint sensing area FSA in the first and/or second direction. As such, a parasitic capacitance Cp may be formed between the common power source line VCOM and the pixel electrode PX of each of the unit sensors 142. A common voltage (e.g., a reset voltage) having a predetermined level may be supplied to the common power source line VCOM in synchronization with an initialization signal to be supplied to the initialization signal line VINIT during a predetermined initialization period.

Figure 10:
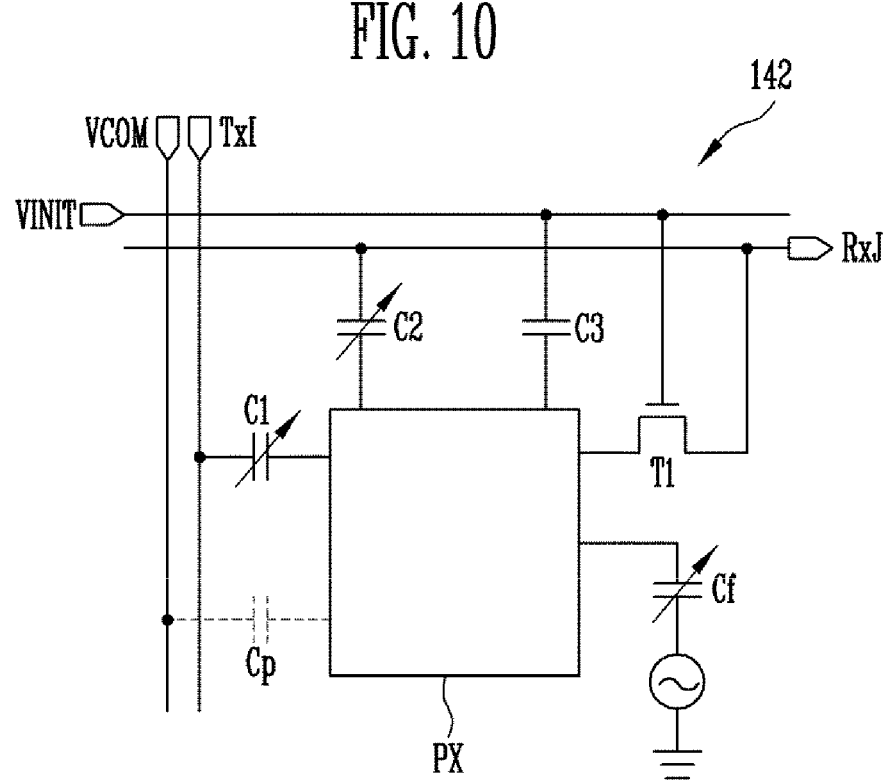
FIG. 10 is a diagram illustrating a unit sensor according to an exemplary embodiment of the invention.

FIG. 10 is a diagram illustrating a unit sensor 142 according to an exemplary embodiment of the invention, which has a structured modified from that of FIG. 7. In FIG. 10, like reference numerals are used to designate the same or similar elements as those in FIG. 7, and thus, repeated descriptions thereof will be omitted to avoid redundancy.

Referring to FIG. 10, the orientations of the driving lines TxI and the sensing lines RxJ may be changed as compared to that in FIG. 7. For example, the driving lines TxI may be disposed in the column direction, and the sensing lines RxJ may be disposed in the row direction.

In an exemplary embodiment, the switching element T1 may be coupled between the corresponding sensing line RxJ and the pixel electrode PX. In this case, a reset voltage may be supplied through the sensing line RxJ during a predetermined initialization period.

FIGS. 11A to 13 are diagrams illustrating a unit sensor 142 according to exemplary embodiments of the invention. In the description of FIGS. 11A to 13, like reference numerals are used to designate the same or similar elements as those of the foregoing embodiments, and thus, repeated descriptions thereof will be omitted to avoid redundancy.

Referring to FIGS. 11A to 13, first and second capacitance elements C1 and C2 may be provided with a pixel electrode PX interposed therebetween in the same manner as that of the foregoing exemplary embodiments, and be coupled between a corresponding driving line TxI and a corresponding sensing line RxJ. At least one of the first and second capacitance elements C1 and C2 may be a variable capacitance element.

The switching element T1 may be coupled between the corresponding pixel electrode PX and a driving line (e.g., TxI+1) or a sensing line (e.g., RxJ−1) of an adjacent unit sensor. For example, the switching element T1 may be coupled between the pixel electrode PX of the corresponding unit sensor 142 and the sensing line RxJ−1 disposed on an adjacent column.

In an exemplary embodiment, a control electrode of the switching element T1 may be coupled to any one of initialization signal lines VINIT disposed around the switching element T1. In this case, the initialization signal lines VINIT may be disposed on the fingerprint sensing area FSA in one direction or in a mesh shape, and be simultaneously supplied with the same signal. The initialization signal lines VINIT may be individually separated from each other. Alternatively, all of the initialization signal lines VINIT may be electrically coupled to each other and be formed as a single signal line or substantially a single signal line. Hence, although FIGS. 11A to 13 illustrate a plurality of initialization signal lines VINIT, the inventive concepts are not limited thereto, and the initialization signal lines VINIT may be implemented as the same initialization signal line VINIT or substantially the same initialization signal line VINIT.

In addition, a common power source line VCOM may be optionally disposed around each unit sensor 142.

In exemplary embodiments, the switching element T1 may be turned on in response to a gate-on voltage supplied from the initialization signal line VINIT during a predetermined initialization period, and transmit a reset voltage supplied to the sensing line RxJ−1 provided on the adjacent column to the pixel electrode PX during the initialization period. In an exemplary embodiment, the unit sensors 142 may be simultaneously operated during at least the initialization period. Hence, during the initialization period, the same reset voltage may be simultaneously supplied to the sensing lines RxJ−1 and RxJ. Therefore, the unit sensors 142 shown in FIGS. 11A to 13 may be operated in substantially the same manner as that of the unit sensors 142 of illustrated in FIGS. 7A to 10.

Figure 14:
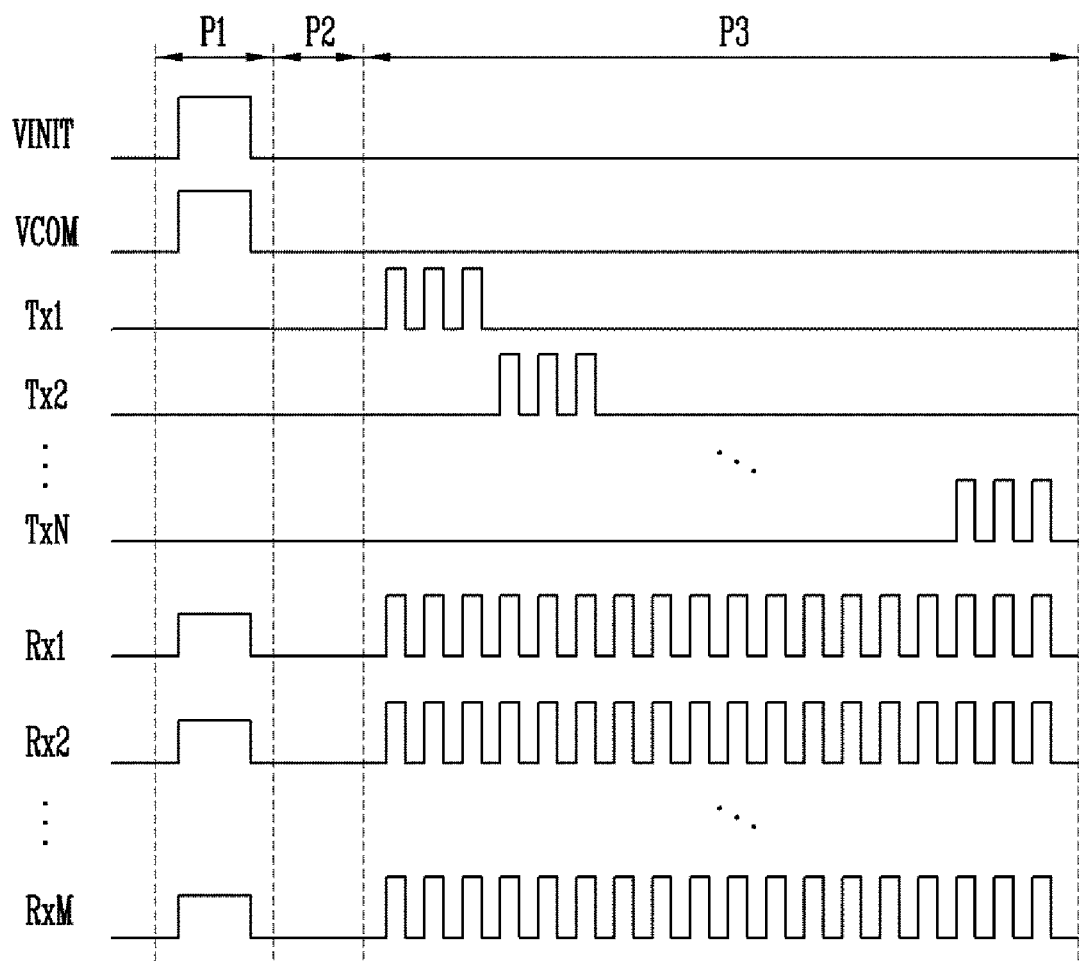
FIG. 14 is a diagram illustrating a driving timing of a unit sensor according to an exemplary embodiment of the invention.
Figure 15A:
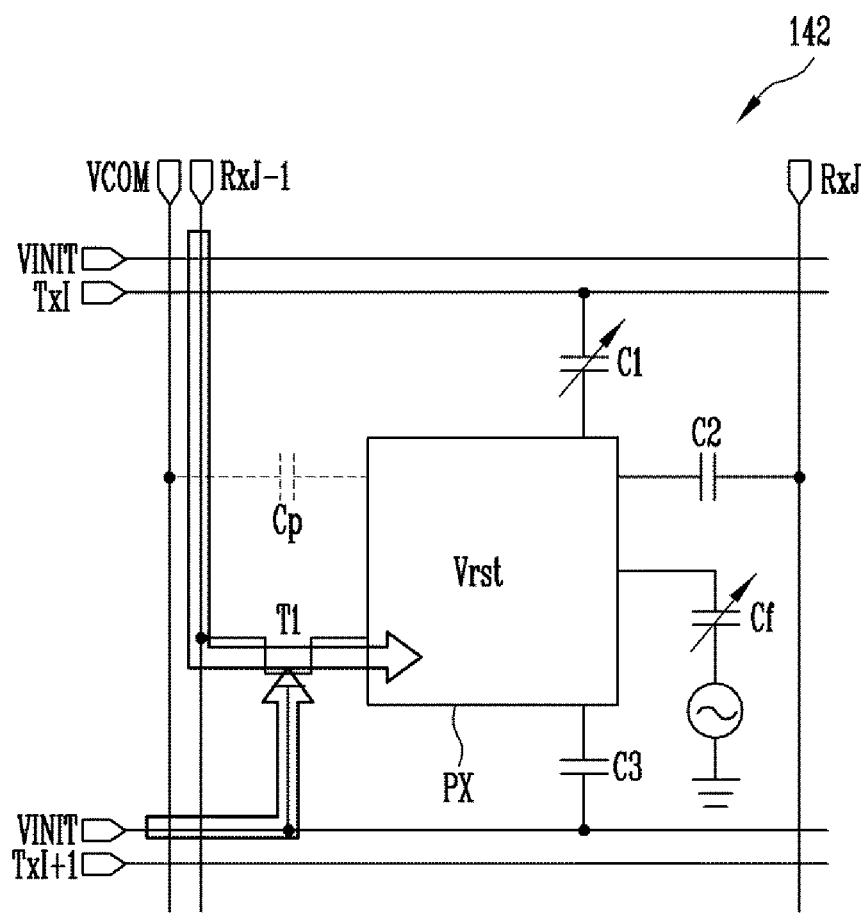
FIGS. 15A, 15B, and 15C are diagrams illustrating an operation process of a unit sensor according to an exemplary embodiment of the invention.
Figure 15B:
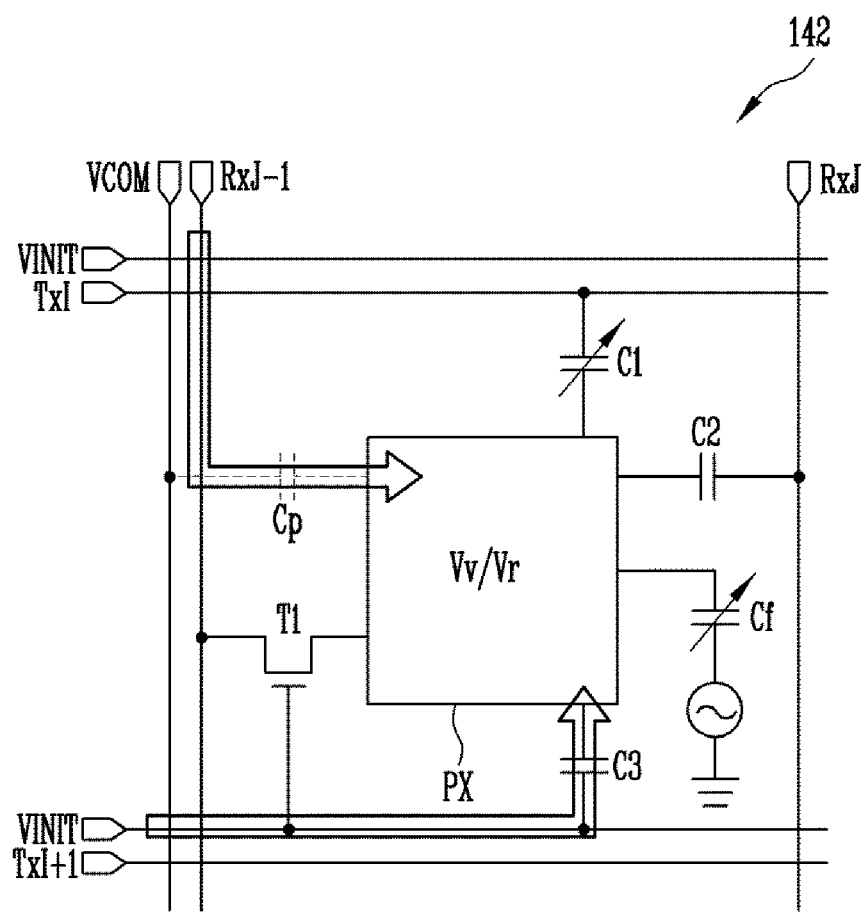
Figure 15C:
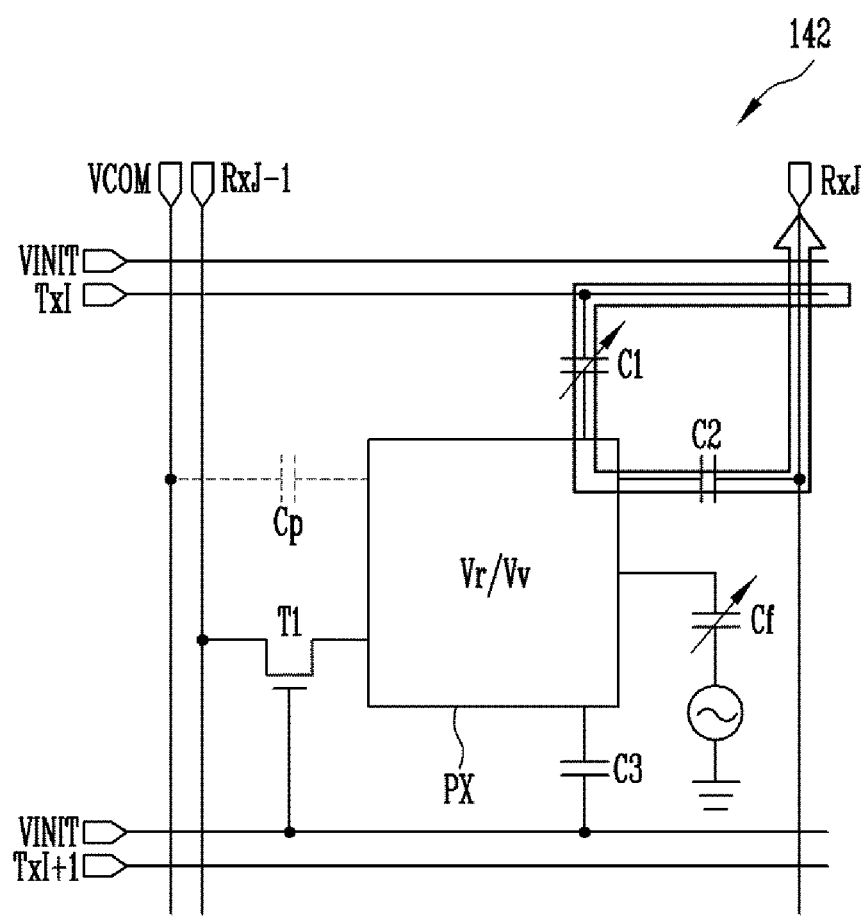

FIG. 14 is a diagram illustrating a driving timing of the unit sensor 142 according to an exemplary embodiment. FIGS. 15A to 15C are diagrams illustrating an operation process of the unit sensor 142 according to an exemplary embodiment. In FIGS. 14 to 15C, the unit sensor 142 and a driving method thereof will be described as having the structure of the unit sensor 142 of FIG. 11. However, the unit sensors 142 according to other exemplary embodiments described above may be operated in substantially the same scheme and/or principle. Furthermore, in FIGS. 14 to 15C, it is assumed that a fingerprint region of the fingerprint contacts the corresponding unit sensor 142 and a peripheral area thereof.

Referring to FIGS. 14 and 15A, during a first period P1, an initialization signal having a gate-on voltage capable of turning on the switching element T1 may be supplied to the initialization signal line VINIT, and a reset voltage Vrst may be simultaneously supplied to the sensing lines Rx1 to RxM coupled to the respective switching elements T1 of the unit sensors 142. The sensing lines Rx to RxM may be coupled to a predetermined driving circuit or a reset voltage source (e.g., a predetermined driving circuit or a reset voltage source provided in the sensor circuit unit 170) for supplying the reset voltage Vrst during the first period P1. Thus, the sensing lines Rx to RxM may be supplied with a predetermined reset voltage Vrst from the driving circuit, the reset voltage source, or the like. When the switching element T1 of each of the unit sensors 142 is coupled to any one of the driving lines Tx1 to TxN in the same manner as those in FIGS. 7 to 9, the reset voltage Vrst may be simultaneously supplied to the driving lines Tx1 to TxN during the first period P1.

When an initialization signal having a gate-on voltage is supplied to the initialization signal line VINIT, the switching element T1 may be turned on, so that the reset voltage Vrst is transmitted from the sensing lines Rx to RxM to the pixel electrodes PX. In this manner, each pixel electrode PX may be initialized to the reset voltage Vrst.

In addition, when the common power source line VCOM is disposed around the unit sensor 142, the reset voltage Vrst may be supplied to the common power source line VCOM during the first period P1 for a subsequent coupling operation. In an exemplary embodiment, the initialization signal line VINIT, the common power source line VCOM, the driving lines Tx1 to TxN, and/or the sensing lines Rx to RxM may be operated by the sensor circuit unit 170.

After the initialization signal and the reset voltage Vrst have been supplied for a predetermined time during the first period P1, the voltage of the initialization signal may be changed to a gate-off voltage. The voltage of the common power source line VCOM may also be changed simultaneously with the change in voltage of the initialization signal.

Accordingly, as shown in FIG. 15B, the switching element T1 may be turned off so that, while the pixel electrode PX floats, a coupling operation by the third capacitance element C3 may be generated, which may cause a variation of voltage in the pixel electrode PX. Due to the coupling effect resulting from the coupling operation, information about the pattern (valley or ridge) of the fingerprint may be provided to the corresponding unit sensor 142. As such, when the pixel electrode PX floats and the voltage of the initialization signal line VINIT is also changed, a change in the voltage of the pixel electrode PX may be caused by the third capacitance element C3. A coupling operation by the first and second capacitance elements C1 and C2 and/or a parasitic capacitance Cp, as well as the third capacitance element C3, may also affect the change in the voltage of the pixel electrode PX. In this case, the capacitance of each capacitance element, particularly, the third capacitance element C3, may be set such that the amount of voltage change in the pixel electrode PX may be secured to a degree enough to recognize the pattern of the fingerprint.

In detail, when the voltage of the initialization signal is changed to the gate-off voltage, the switching element T1 is turned off, which may cause the pixel electrode PX to float. In other words, the switching element T1 is provided to cause the pixel electrode PX to remain in the floating state when the pixel electrode PX is initialized and also after the initialization of the pixel electrode PX has been completed. The switching element T1 may be designed by taking into account leakage current characteristics (e.g., to minimize the leakage current).

As such, when the pixel electrode PX floats and also the voltage levels of the initialization signal and the common voltage change, the coupling operation is generated. Due to the coupling effect resulting from the coupling operation, a voltage (Vr or Vv) corresponding to a ridge or a valley of the fingerprint may be applied to the corresponding pixel electrode PX. For example, when the ridge of the fingerprint is disposed over the pixel electrode PX, voltage distribution corresponding to the magnitude of a contact capacitance Cf formed between the pixel electrode PX and the finger is generated, and a voltage Vr corresponding to the ridge of the fingerprint is applied to the pixel electrode PX. On the other hand, when the valley of the fingerprint is disposed over the pixel electrode PX, a voltage Vv corresponding to the valley of the fingerprint is applied to the pixel electrode PX. In this case, if the unit sensors 142 of the fingerprint sensing area FSA are initialized and then the coupling operation is performed on the unit sensors 142 at the same time, a vertical electric field between the unit sensors 142 and the finger may be reinforced, so that a signal-to-noise ratio (SNR) may be increased.

Simultaneously with the change of the voltage of the initialization signal to the gate-off voltage, the voltage of each of the sensing lines Rx1 to RxM is changed to an initialization level voltage for a sensing operation.

After the voltages of the initialization signal line VINIT, the common power source line VCOM, and the sensing lines Rx1 to RxM have been changed, the changed voltages are maintained during a predetermined period, e.g., a second period (determination period) P2. In an exemplary embodiment, whether to perform a sensing operation of substantially detecting a fingerprint and/or a touch input may be determined during the second period. For example, during the second period P2, coupling current flowing through the entirety of the sensor unit 140 detected, and thus, whether a touch of the finger has occurred may be determined depending on whether the coupling current has been detected or the magnitude of the coupling current.

When it is determined that the touch of the finger has occurred, during a third period (sensing period) P3, a driving signal is successively supplied to the driving lines Tx1 to TxN, and sensing signals corresponding to the driving signal are detected from the sensing lines Rx1 to RxM, and then supplied to the sensor circuit unit 170. In particular, during the third period P3, as shown in FIG. 15C, fingerprint information stored in the unit sensors 142 is read out using a mutual capacitance formed between the driving line TxI and the sensing line RxJ of each unit sensor 142.

More particularly, between each driving line (any one of Tx1 to TxN) and each sensing line (any one of Rx1 to RxM), the first and second capacitance elements C1 and C2 of the corresponding unit sensor 142 are coupled to each other via the pixel electrode PX. As such, if a driving signal is successively supplied to the driving lines Tx1 to TxN, sensing signals that vary in the forms corresponding to the driving signal are output from the respective sensing lines Rx1 to RxM. Furthermore, each sensing line (any one of Rx1 to RxM) intersects with the plurality of driving lines Tx1 to TxN. Therefore, during a period in which the driving signal is successively supplied to the driving lines Tx1 to TxN, a sensing signal corresponding to the driving signal may be continuously output from each sensing line (any one of Rx1 to RxM). During the third period P3, the third capacitance element C3 along with the parasitic capacitance Cp may function as a load. Hence, the sensitivity of the fingerprint sensor may be adjusted by adjusting a capacitance ratio of the first to third capacitance elements C1, C2, and C3, for example.

The fingerprint sensor may repeatedly perform the above-described operation in response to the fingerprint sensing mode, and output a sensing signal corresponding to the shape of the fingerprint. In this case, during the third period P3, the sensor circuit unit 170 may detect voltages input through each of the sensing channels in real-time, and accumulate (integrate) the voltages, thus detecting the amount of charge corresponding to each of the unit sensors 142.

More particularly, according to an exemplary embodiment, since at least one of the first and second capacitance elements C1 and C2 is formed of a variable capacitance element, the amount of charge detected from the unit sensor 142 may be different depending whether the unit sensor 142 contacts a ridge of the fingerprint or a valley of the fingerprint. Therefore, the shape of the fingerprint may be detected by synthesizing (e.g., comparing and analyzing) the amounts of charges detected from the respective unit sensors 142.

Figure 16A:
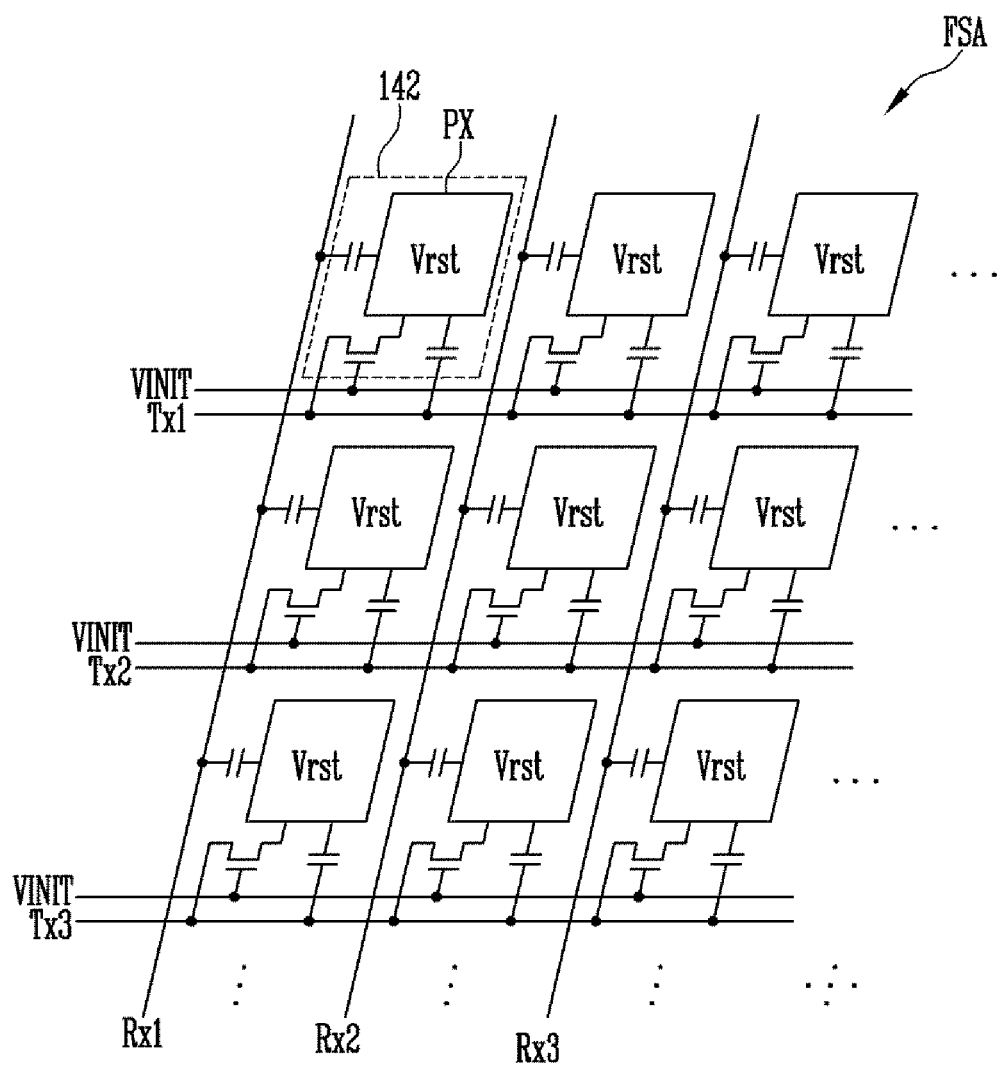
FIGS. 16A, 16B, and 16C are diagrams illustrating an operation process of a fingerprint sensor according to an exemplary embodiment of the invention.
Figure 16B:
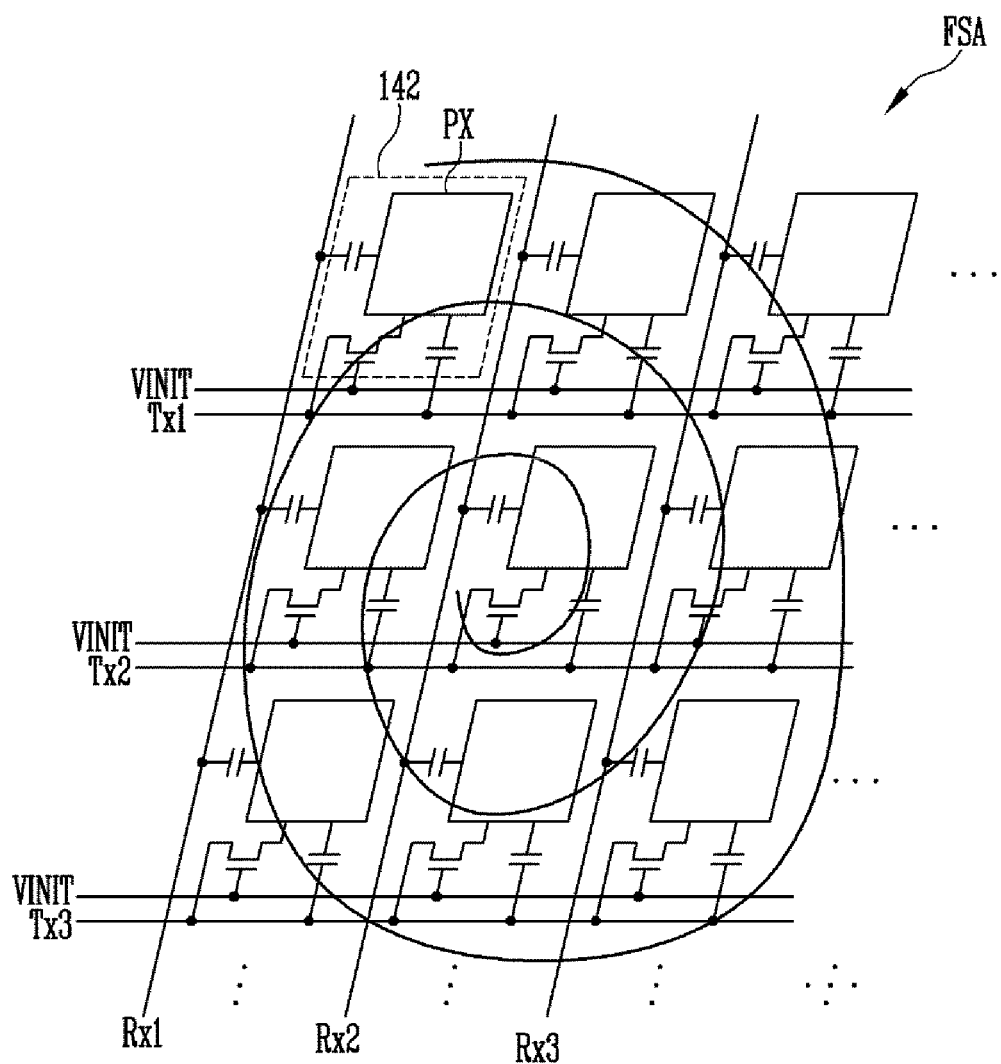
Figure 16C:
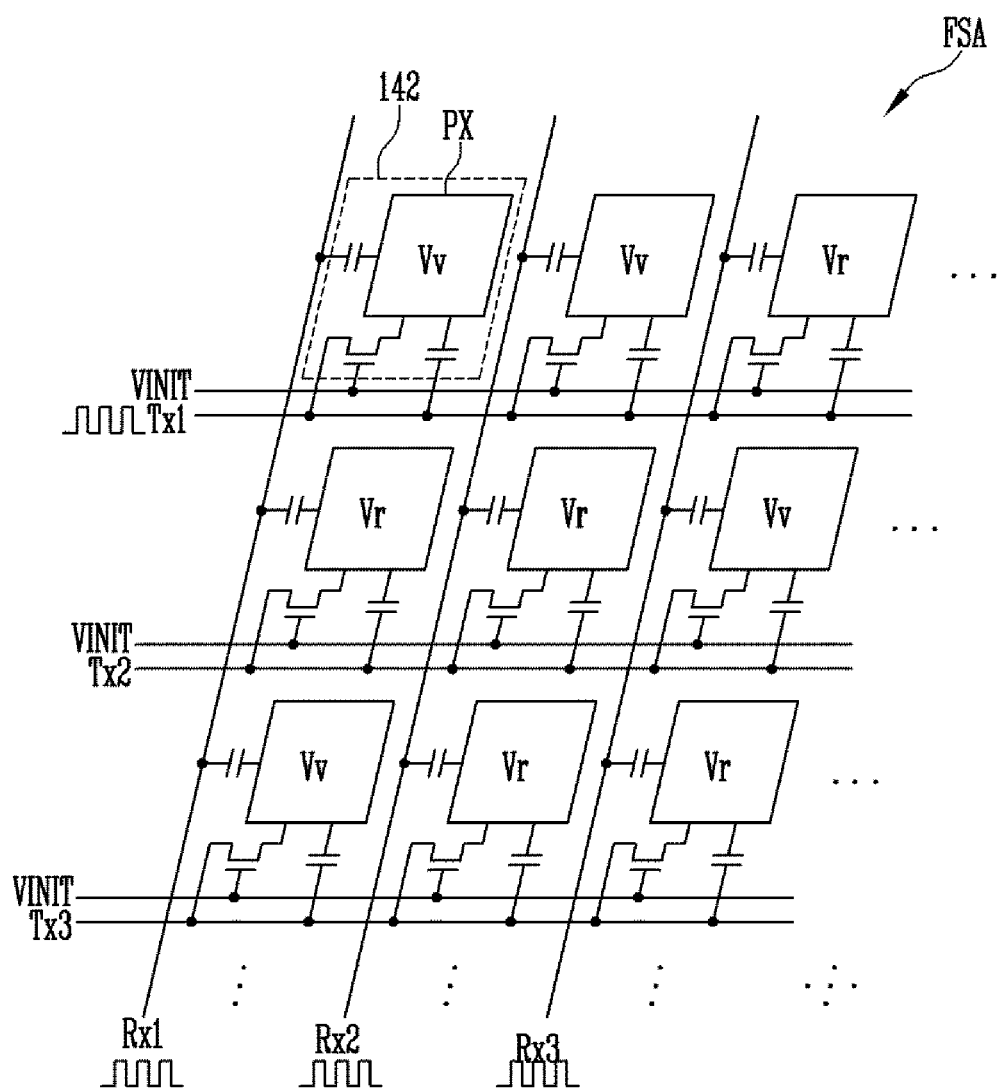

FIGS. 16A to 16C are diagrams illustrating an operation process of the fingerprint sensor according to an exemplary embodiment. In detail, FIGS. 16A to 16C schematically illustrate the overall operation process of the fingerprint sensor. Furthermore, detailed description of the operation process of the unit sensor described with reference to FIGS. 15A to 15C will be omitted to avoid redundancy.

As shown in FIG. 16A, during a predetermined initialization period, an initialization signal having a gate-on voltage and a reset voltage Vrst are supplied to the unit sensors 142. As such, the unit sensors 142 are simultaneously initialized.

Thereafter, as shown in FIG. 16B, a coupling operation is performed on the unit sensors 142 at the same time during a predetermined coupling period. During the coupling operation, fingerprint information (e.g., a predetermined voltage Vr or Vv based on the shape of the fingerprint) is stored to each of the unit sensors 142.

Subsequently, as shown in FIG. 16C, the driving lines Tx1, Tx2, . . . and TxN are successively operated, and the fingerprint information Vr and/or Vv is detected using sensing signals output from the sensing lines Rx1, Rx2, . . . and Rxn.

As described above, when the unit sensors 142 according to an exemplary embodiment are simultaneously operated during the initialization period and the coupling period before the sensing signals are detected, the blur may be reduced and the signal-to-noise ratio may be increased.

Figure 18A:
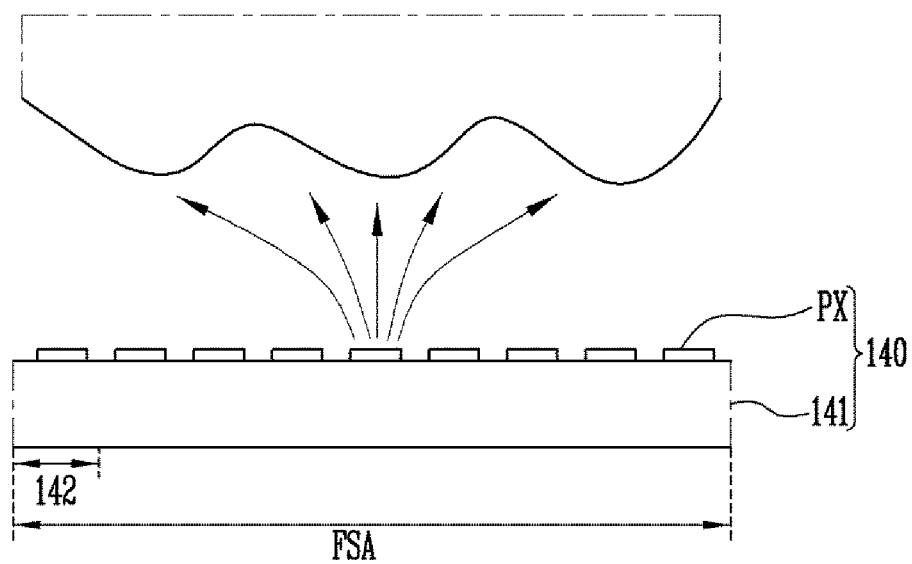
FIGS. 18A and 18B respectively illustrate electric fields formed between a fingerprint sensor and the finger of a user during an individual coupling operation and a simultaneous coupling operation of unit sensors.
Figure 18B:
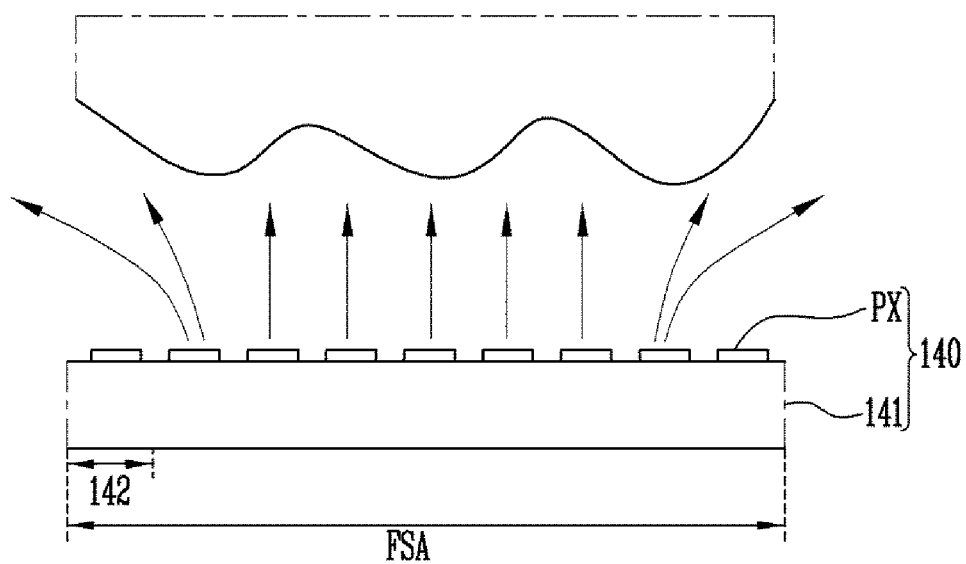

FIG. 17 is a diagram illustrating a difference in occurrence of blurs between coupling methods. FIGS. 18A and 18B respectively illustrate electric fields formed between the fingerprint sensor and the finger of the user during an individual coupling operation and a simultaneous coupling operation of the unit sensors 142.

Referring to FIG. 17, when the coupling operation is performed in a point scheme (or on a point basis), in which the coupling effect is generated only on a certain unit sensor 142a of the unit sensors 142, and peripheral unit sensors 142b of the certain unit sensor 142a are not operated, an electric field formed between the certain unit sensor 142a and the finger spreads out, as shown in FIG. 18A, which may cause the occurrence of a relatively larger blur.

On the other hand, when the coupling operation is performed on all of the unit sensors 142 at the same time in a surface scheme (or on a surface basis), in which the coupling effect is generated on all of the unit sensors 142, a vertical electric field formed between the unit sensor 142a and the finger is reinforced, and a spreading-out electric field is weakened as shown in FIG. 18B, which may cause occurrence of a relatively smaller blur.

When the coupling operation is performed in a line scheme (or on a line basis), in which the coupling effect is generated on unit sensors 142 on a row or column basis, a moderate blur that is less than the blur generated by the point scheme coupling operation and greater than the blur generated the surface scheme coupling operation may be generated.

Since the unit sensors 142 according to an exemplary embodiment are simultaneously operated during the predetermined initialization period and the coupling period, the vertical electric field between the finger and the unit sensors 142 may be reinforced, which may reduce the blur and increase the signal-to-noise ratio.

Figure 19A:
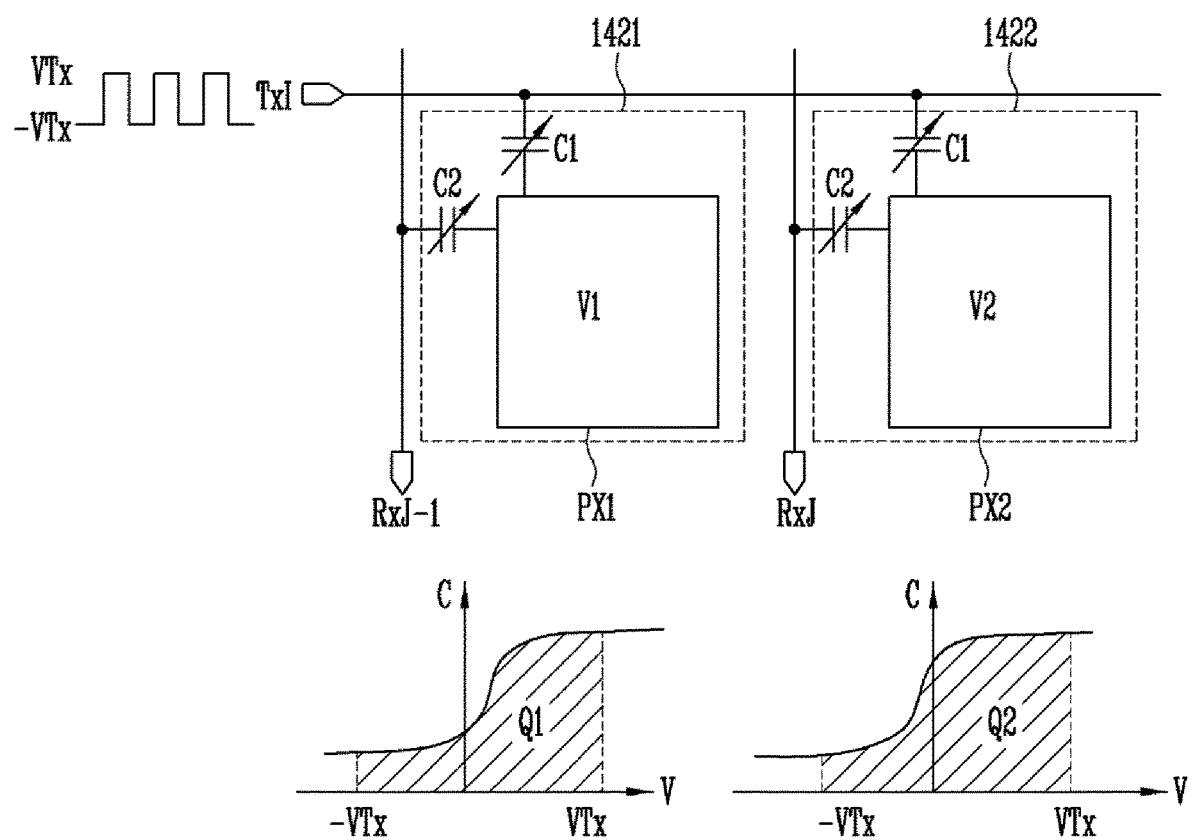
FIGS. 19A and 19B illustrate the amounts of charges detected from unit sensors according to an exemplary embodiment of the invention and a comparative embodiment, respectively.
Figure 19B:
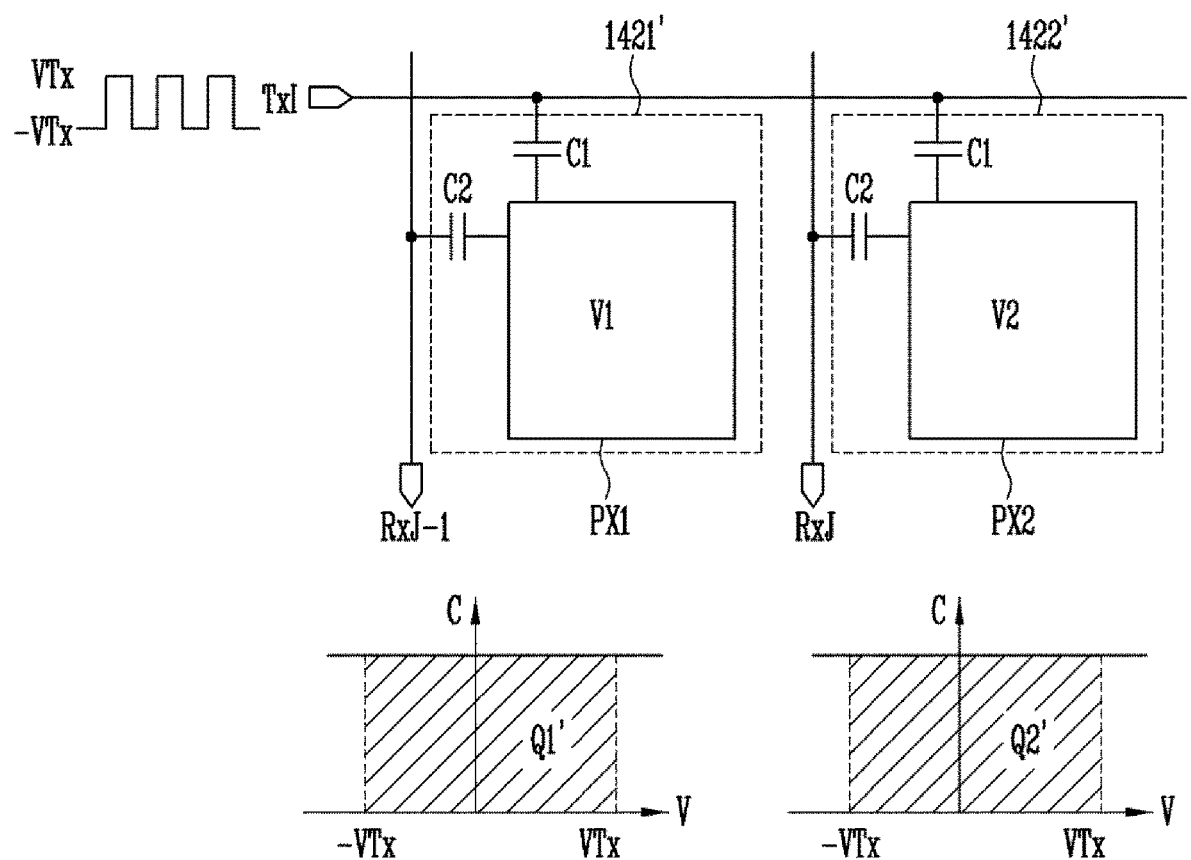

FIGS. 19A and 19B respectively illustrate the amount of charges detected from unit sensors according to an exemplary embodiment and a comparative embodiment. In detail, FIGS. 19A and 19B illustrate a difference in the amount of charges detected during a sensing period between a unit sensor according to an exemplary embodiment and a unit sensor according to a comparative embodiment, and the structure of each unit sensor is equivalently illustrated based on the sensing period.

Referring to FIG. 19A, according to an exemplary embodiment, a deviation between charge amounts Q1 and Q2 of unit sensors 1421 and 1422 is detected using mutual capacitances between the driving lines TxI and the sensing lines RxJ during the sensing period. For example, during the coupling period preceding the sensing period, due to a difference of a fingerprint pattern, it is assumed that a first voltage V1 is applied to a pixel electrode PX1 of the first unit sensor 1421, and a second voltage V2 different from the first voltage V1 is applied to a pixel electrode PX2 of the second unit sensor 1422. In this case, C-V characteristic curves of the first and second unit sensors 1421 and 1422 are shifted to different degrees by the first and second voltages V1 and V2.

More particularly, because the first and/or second capacitance element C1 and/or C2 coupled to the driving line TxI and the sensing line RxJ are formed of a variable capacitance element, the mutual capacitance between the driving line TxI and the sensing line RxJ has C-V characteristics that vary depending on the voltage. Furthermore, according to an exemplary embodiment, an operating voltage range of the variable capacitance element may be set to include a Cmin/Cmax transition period of the C-V characteristic curve.

Therefore, when the C-V characteristic curves of the first and second unit sensors 1421 and 1422 are shifted to different degrees by the deviation of the first and second voltages V1 and V2, the charge amounts Q1 and Q2 detected from the first and second unit sensors 1421 and 1422 during the sensing period may be different from each other. Hence, the deviation between the first and second voltages V1 and V2 may be detected by detecting a deviation between the charge amounts Q1 and Q2. In this manner, the shape of the fingerprint may be detected.

On the other hand, according to the comparative embodiment of FIG. 19B, unit sensors 1421' and 1422' are formed of fixed capacitance elements, in which first and second capacitance elements C1 and C2 have constant capacitances regardless of voltages V1 and V2 applied to pixel electrodes PX1 and PX2. Therefore, in the unit sensors 1421' and 1422' according to the comparative embodiment, charge amounts Q1' and Q2' detected during the sensing period are substantially the same as each other regardless of the voltages V1 and V2 applied to the pixel electrodes PX1 and PX2. As such, the unit sensors 1421' and 1422' according to the comparative embodiment may not detect the shape of the fingerprint.

Figure 20:
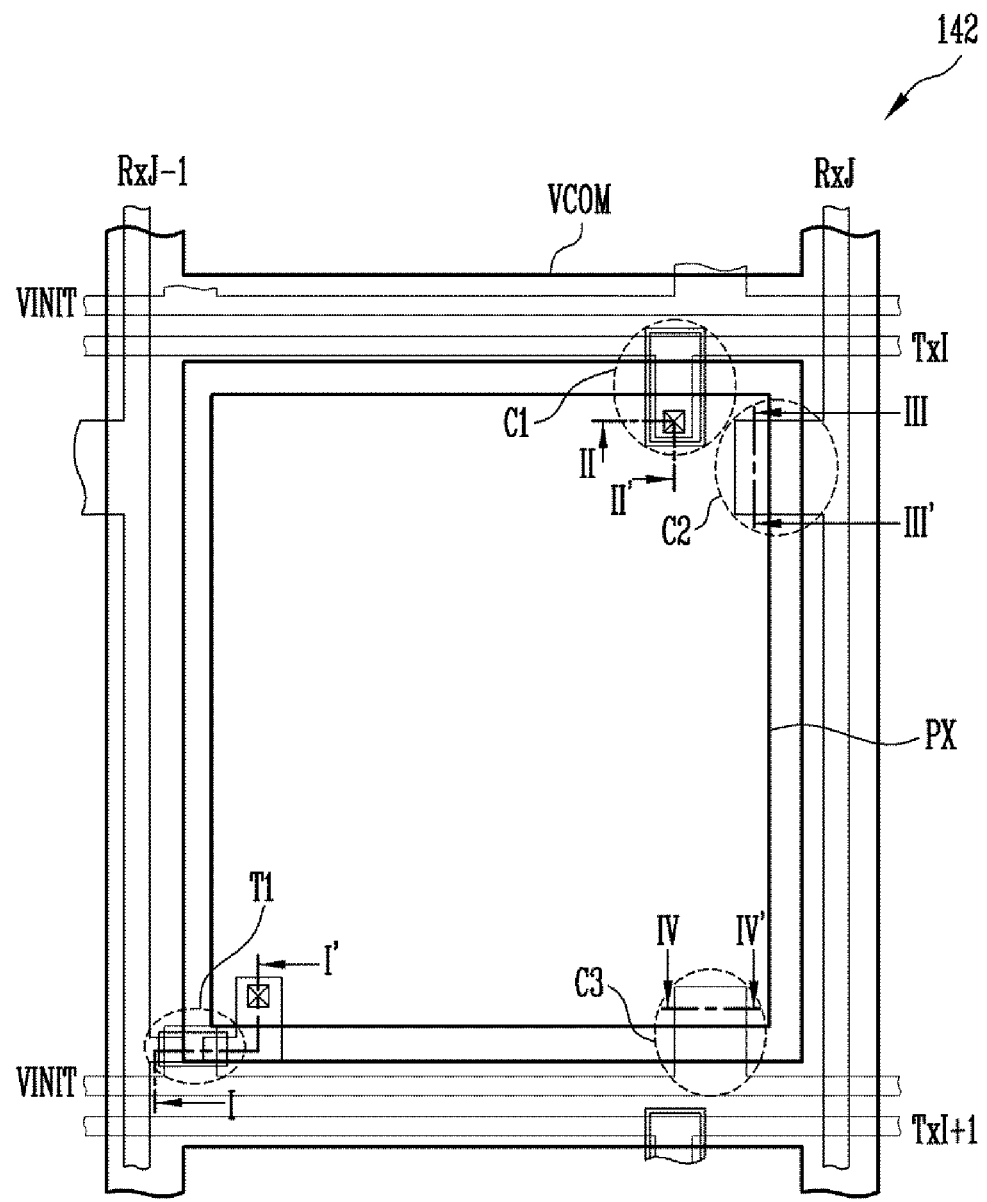
FIG. 20 is a diagram illustrating a layout of a unit sensor according to an exemplary embodiment of the invention.
Figure 21:
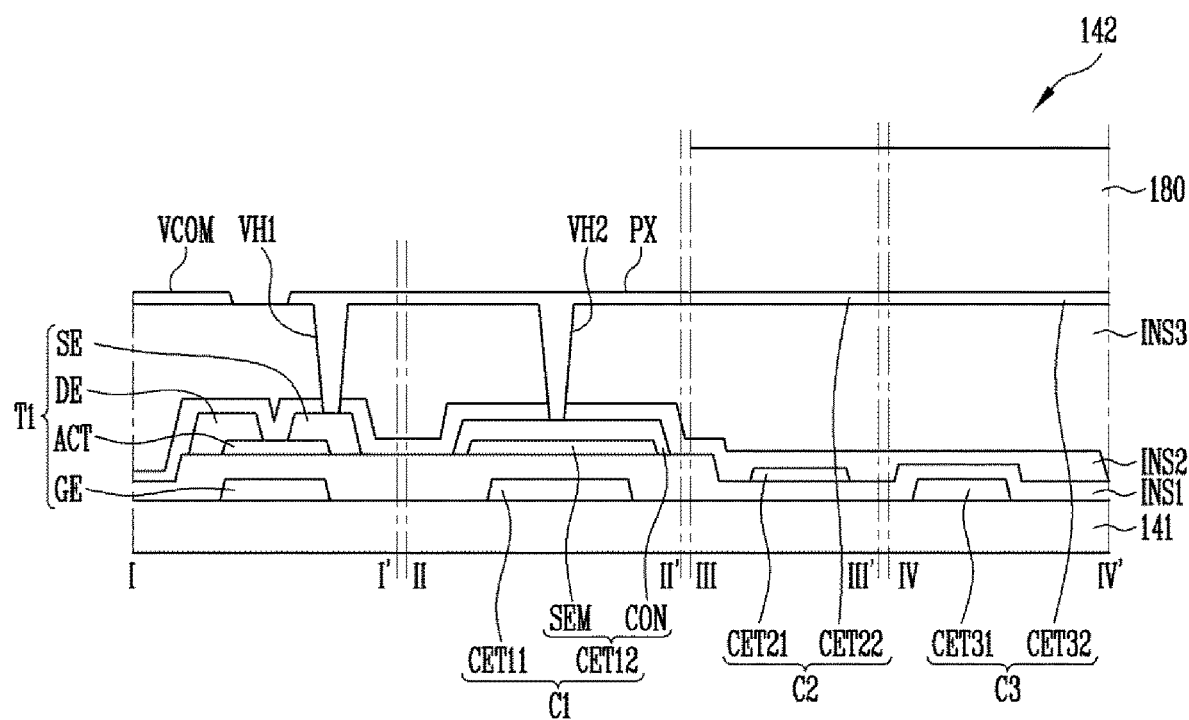
FIG. 21 is a cross-sectional view of a unit sensor according to an exemplary embodiment of the invention.

FIG. 20 is a diagram illustrating a layout of the unit sensor according to an exemplary embodiment. The layout of the unit sensor of FIG. 20 will be described as having the layout of the unit sensor shown in FIG. 11B. FIG. 21 illustrates a cross-sectional view of the unit sensor according to an exemplary embodiment, which shows cross-sectional structures of circuit elements of the unit sensor.

Figure 11A:
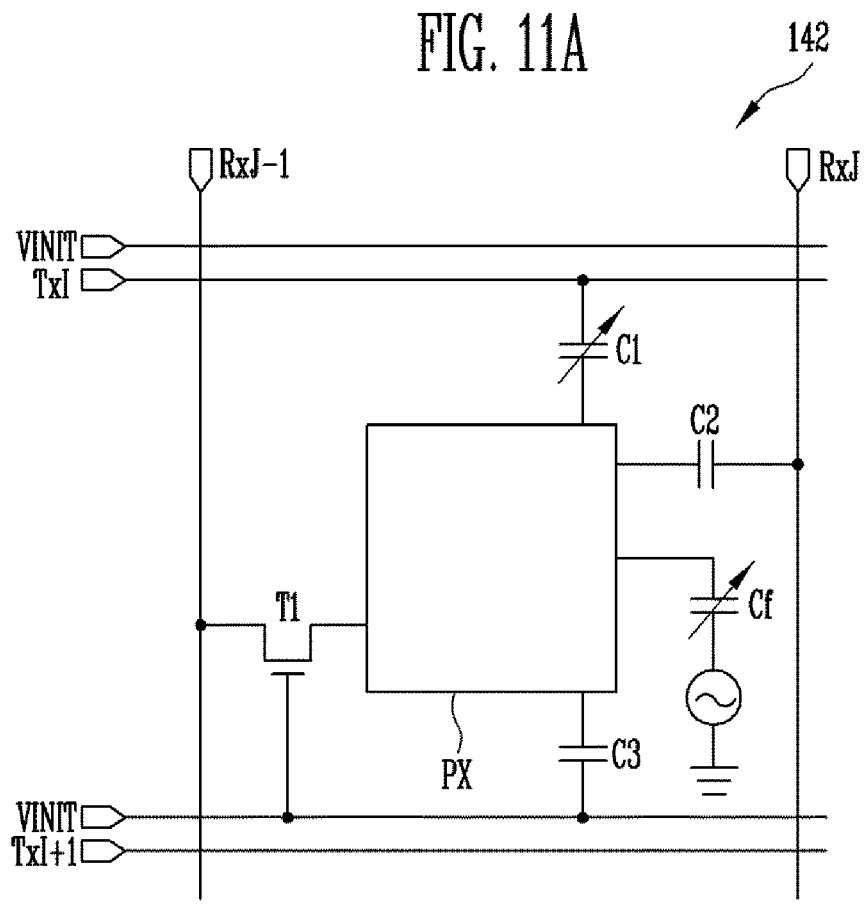
FIGS. 11A and 11B are diagrams illustrating unit sensors according to exemplary embodiments of the invention.
Figure 11B:
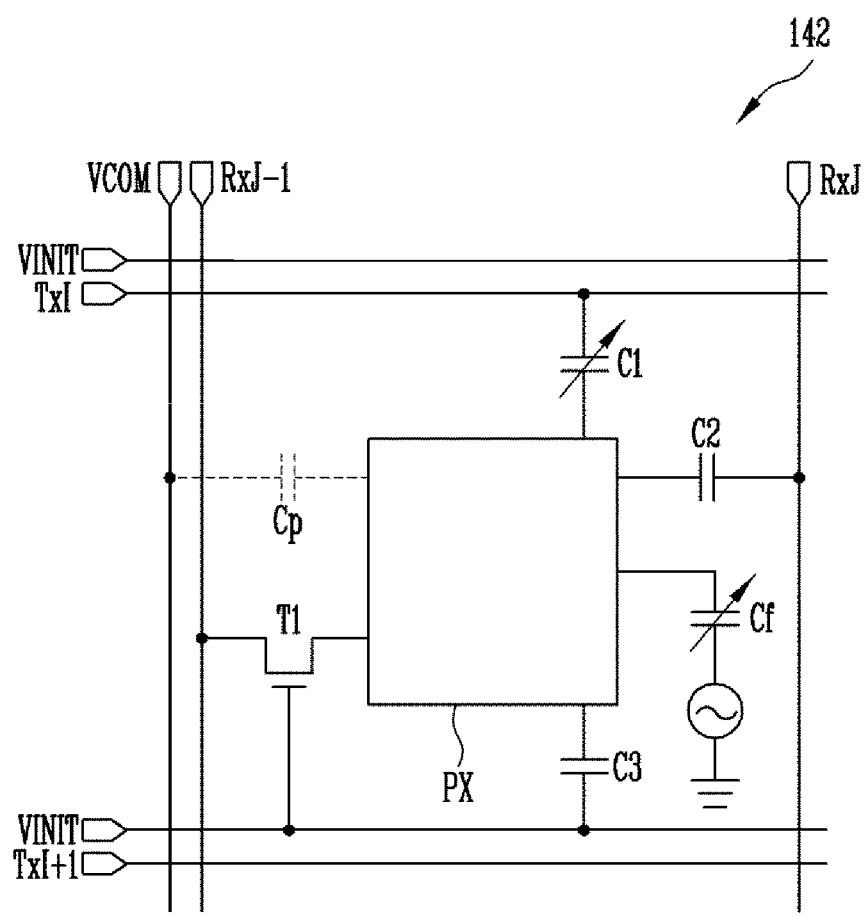
Figure 12:
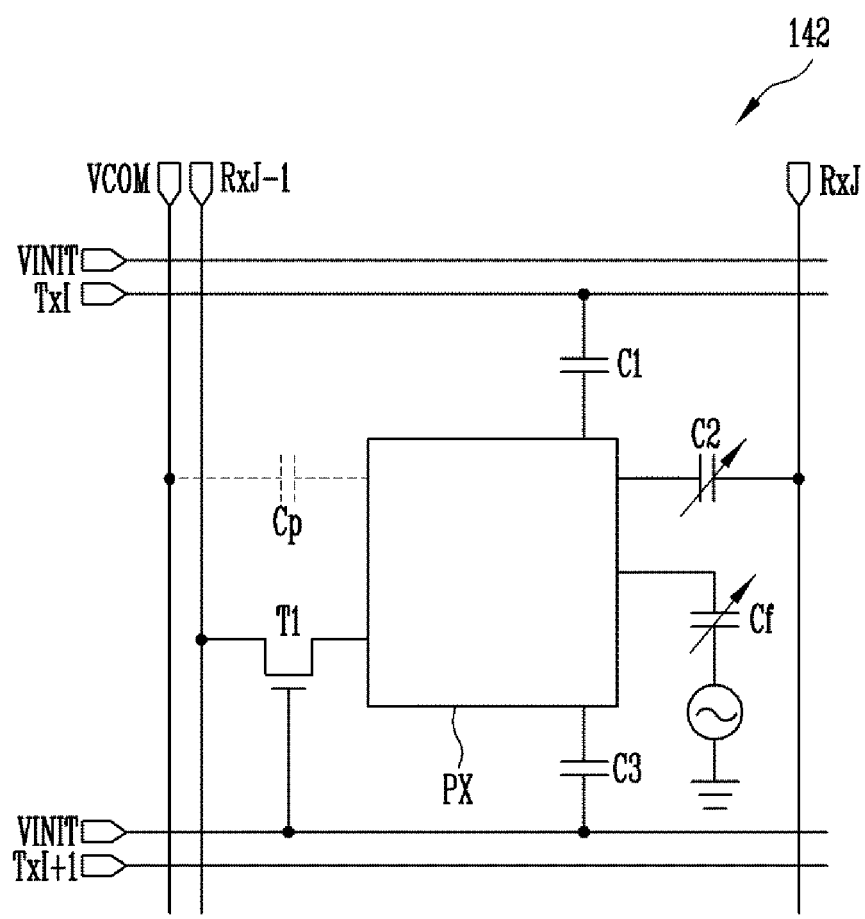
FIG. 12 is a diagram illustrating a unit sensor according to an exemplary embodiment of the invention.
Figure 13:
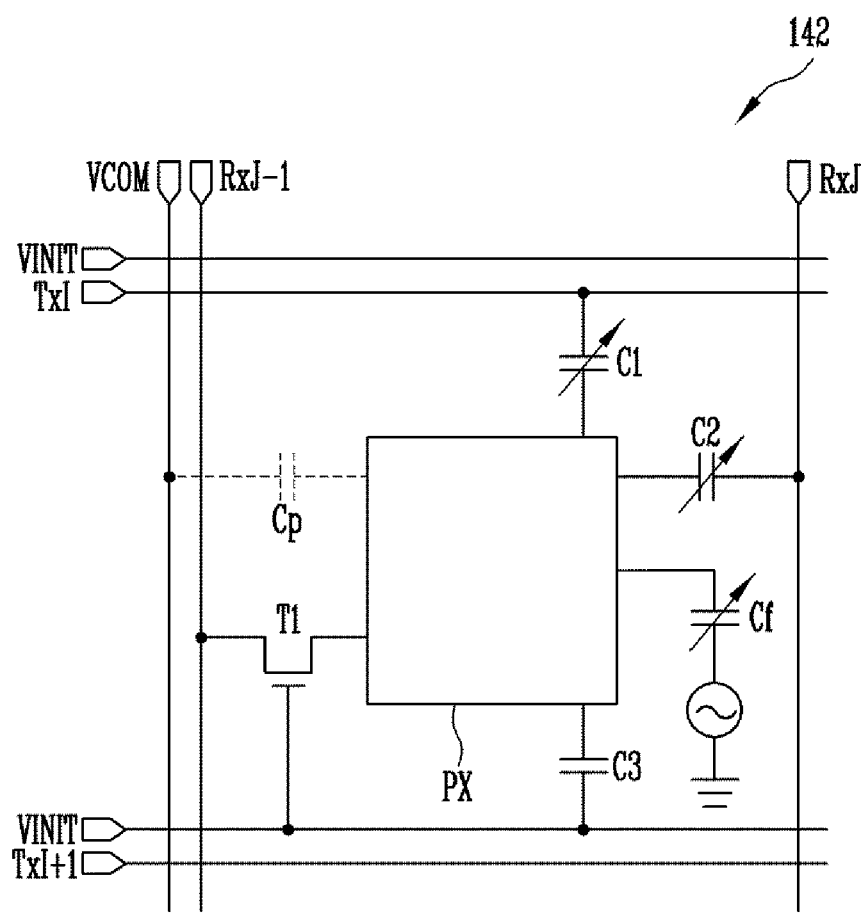
FIG. 13 is a diagram illustrating a unit sensor according to an exemplary embodiment of the invention.

Referring to FIGS. 20 and 21, driving lines TxI and TxI+1 and sensing lines RxJ−1 and RxJ respectively extend in the first and second directions intersecting with each other. Pixel electrodes PX are disposed in respective areas defined between the driving lines TxI and TxI+1 and the sensing lines RxJ−1 and RxJ. Furthermore, the initialization signal line VINIT and the common power source line VCOM are further disposed around the unit sensors 142. As described above, the common power source line VCOM may be omitted in some exemplary embodiments. For example, when the layout of the unit sensor according to an exemplary embodiment does not include the common power source line VCOM as shown in FIG. 11A, the common power source line VCOM may also be omitted in FIGS. 20 and 21.

According to an exemplary embodiment, a plurality of initialization signal lines VINIT may extend in the first direction and be disposed adjacent to the respective driving lines TxI and TxI+1, but the inventive concepts are not limited thereto. In particular, the initialization signal line VINIT may extend in the first or second direction or be formed in a mesh shape and disposed around the unit sensors 142.

According to an exemplary embodiment, the common power source line VCOM may be formed to have a mesh shape enclosing the pixel electrodes PX at positions spaced apart from the respective pixel electrodes PX. For example, the common power source line VCOM may have openings corresponding to the respective pixel electrodes PX, and be disposed to overlap the driving lines TxI and TxI+1, the sensing lines RxJ−1 and RxJ, and the initialization signal line VINIT. In addition, the common power source line VCOM may be disposed on a layer different from the driving lines TxI and TxI+1, the sensing lines RxJ−1 and RxJ, and the initialization signal line VINIT, and spaced apart therefrom. For example, the common power source line VCOM may be disposed on the same layer as the pixel electrode PX and spaced apart from the pixel electrode PX by a predetermined distance.

According to an exemplary embodiment, a drain electrode DE and a gate electrode GE of each switching element T1 may be formed by a portion of the sensing line RxJ−1 protruding from an adjacent unit sensor disposed on the preceding column and a portion of the initialization signal line VINIT protruding therefrom and intersecting the sensing line RxJ−1. An active layer ACT may be disposed to overlap the drain electrode DE and the gate electrode GE. A portion of the active layer ACT may be coupled to the drain electrode DE, and another portion of the active layer ACT may be coupled to pixel electrode PX of the corresponding unit sensor 142 via the source electrode SE.

According to an exemplary embodiment, the switching element T1 may have a bottom-gate structure. For example, the switching element T1 may include a gate electrode GE disposed on a sensor substrate 141, an active layer ACT disposed on the gate electrode GE with a first insulating layer INS1 interposed therebetween, and a drain electrode DE and a source electrode SE that are disposed on respective opposite ends of the active layer ACT. In this case, the initialization signal line VINIT may be provided integrally with the gate electrode GE of the switching element T1 and disposed on a gate layer on the sensor substrate 141.

The active layer ACT of the switching element T1 may be disposed on the first insulating layer INS1 as a semiconductor layer. In an exemplary embodiment, the active layer ACT may be formed of, e.g., an oxide semiconductor. The material of the active layer ACT is not limited thereto, and the active layer ACT may be formed of various known semiconductor materials.

The drain electrode DE and the source electrode SE of the switching element T1 may be disposed on a source drain layer over the semiconductor layer and electrically coupled to respective different ends of the active layer ACT. In this case, the sensing lines RxJ−1 and RxJ may be provided integrally with the drain electrode DE of the switching element T1 and disposed on the source drain layer.

The structure of the switching element T1 is not limited those shown in FIGS. 20 and 21. For example, the switching element T1 may have various known transistors structures.

Second and third insulating layers INS2 and INS3 may be disposed over the switching element T1. The pixel electrode PX may be disposed over the second and third insulating layers INS2 and INS3. The pixel electrode PX may be electrically coupled to the switching element T1 through a first via hole VH1 passing through the second and third insulating layers INS2 and INS3. FIG. 21 shows that both the second and third insulating layers INS2 and INS3 are provided between the switching element T1 and the pixel electrode PX, but the inventive concepts are not limited thereto. For example, at least one of the second and third insulating layers INS2 and INS3 may be provided between the switching element T1 and the pixel electrode PX. As another example, any one of the second and third insulating layers INS2 and INS3 may be omitted, or the second and third insulating layers INS2 and INS3 may be integrated into a single insulating layer. According to an exemplary embodiment, only the third insulating layer INS3 may be provided between the switching element T1 and the pixel electrode PX.

In an exemplary embodiment, the first capacitance element C1 may include a first electrode CET11 having a first conductive pattern, and a second electrode CET12 having a stack structure including a semiconductor pattern SEM and a second conductive pattern CON. In other words, the first capacitance element C1 may be formed of a variable capacitance element, such as a metal insulator semiconductor (MIS) or metal insulator semiconductor metal (MISM) capacitor. In an exemplary embodiment, the semiconductor pattern SEM may be formed of, e.g., an oxide semiconductor, but the inventive concepts are not limited thereto. The first electrode CET11 and the second conductive pattern CON may be formed of various conductive materials known in the art, such as metal.

In an exemplary embodiment, the first electrode CET11 of the first capacitance element C1 may be formed by a portion of the corresponding driving line TxI protruding therefrom, and disposed on the gate layer along with the driving line TxI. In an exemplary embodiment, the semiconductor pattern SEM and the second conductive pattern CON of the first capacitance element C1 may overlap the first electrode CET11 and the pixel electrode PX. For example, the semiconductor pattern SEM may be disposed on the same layer as the active layer ACT of the switching element T1 and overlap the first electrode CET11 and the pixel electrode PX. The second conductive pattern CON may be disposed on the same layer as the drain electrode DE and the source electrode SE of the switching element T1 and overlap the semiconductor pattern SEM. The second electrode CET12 of the first capacitance element C1 may be formed by electrically connecting the semiconductor pattern SEM and the second conductive pattern CON to each other through direct/indirect contact connection. The second electrode CET12 may be electrically coupled to the pixel electrode PX through a second via hole VH2 passing through the second and third insulating layers INS2 and INS3.

In an exemplary embodiment, the second capacitance element C2 may include a first electrode CET21 and a second electrode CET22, each of which is formed of a conductor. In an exemplary embodiment, the first electrode CET21 of the second capacitance element C2 may protrude from a portion of the corresponding sensing line RxJ, and be disposed integrally with the sensing line RxJ on the source/drain layer. The first electrode CET21 may protrude from the sensing line RxJ and overlap the corresponding pixel electrode PX, whereby the second capacitance element C2 is formed between the first electrode CET21 and the pixel electrode PX. More particularly, according to an exemplary embodiment, the second electrode CET22 of the second capacitance element C2 may be integrally formed with the pixel electrode PX.

In an exemplary embodiment, the third capacitance element C3 may include a first electrode CET31 and a second electrode CET32, each of which is formed of a conductor. In an exemplary embodiment, the first electrode CET31 of the third capacitance element C3 may protrude from a portion of the initialization signal line VINIT, and be disposed integrally with the initialization signal line VINIT on the gate layer. The first electrode CET31 of the third capacitance element C3 may protrude from the initialization signal line VINIT and overlap the corresponding pixel electrode PX, whereby the third capacitance element C3 is formed between the first electrode CET31 and the pixel electrode PX. More particularly, according to an exemplary embodiment, the second electrode CET32 of the third capacitance element C3 may be integrally formed with the pixel electrode PX.

In an exemplary embodiment, a black matrix 180 for preventing external light reflection may be further disposed on a portion of the pixel electrode PX. For example, the black matrix 180 may be disposed to overlap the second and third capacitance elements C2 and C3.

The unit sensor 142 may be formed through a plurality of mask processes. For example, the unit sensor 142 may be formed through a first mask process for patterning the lines and/or the circuit elements of the gate layer, a second mask process for patterning the semiconductor elements of the semiconductor layer, a third mask process for patterning the lines and/or circuit elements of the source drain layer, a fourth mask process for forming the first and second via holes VH1 and VH2, a fifth mask process for patterning the pixel electrode PX, and a sixth mask process for patterning the black matrix 180. In an exemplary embodiment, some mask processes may be integrated to reduce the number of mask processes. For example, lines and/or circuit elements that are disposed on two successive layers may be simultaneously patterned using a half-tone mask, etc. In addition, the process of manufacturing the unit sensor 142 may be simplified by integrating the second and third mask processes or the fifth and sixth mask processes.

Figure 22:
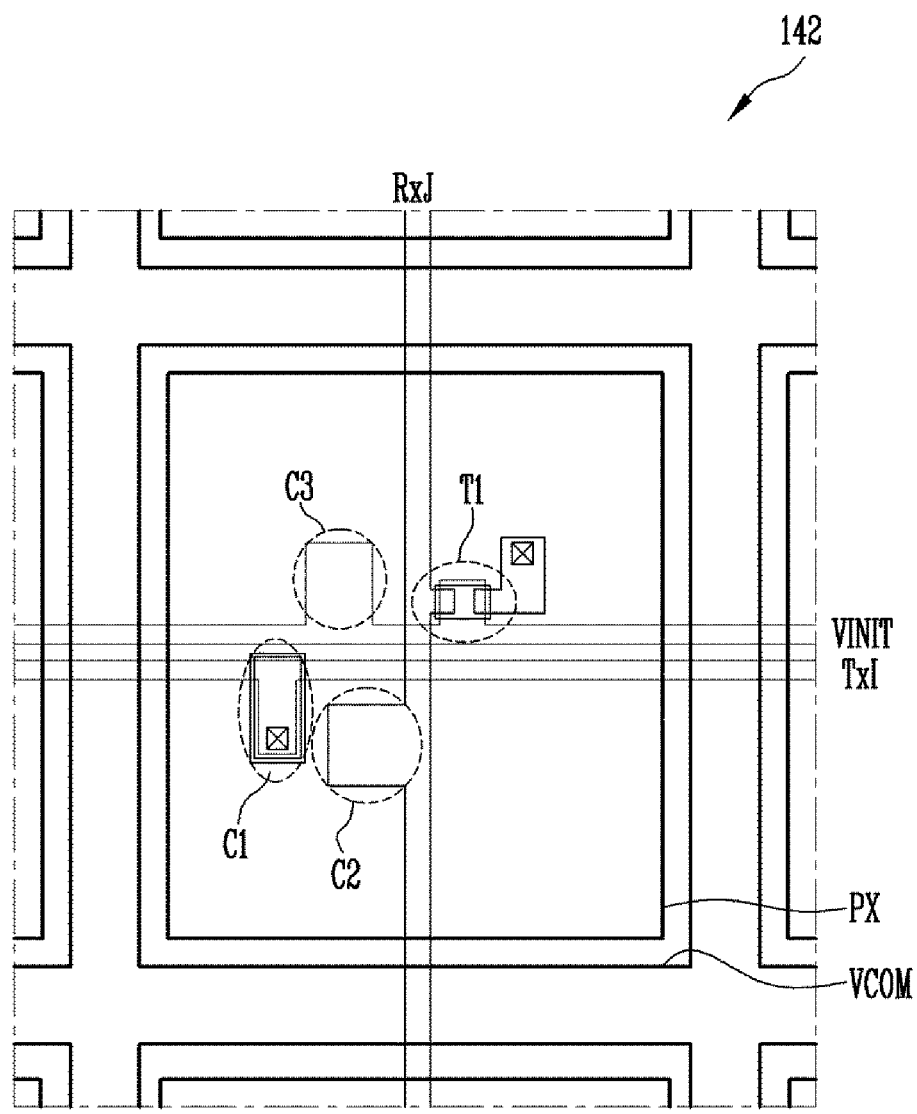
FIG. 22 is a diagram illustrating a layout of a unit sensor according to an exemplary embodiment of the invention.
Figure 23:
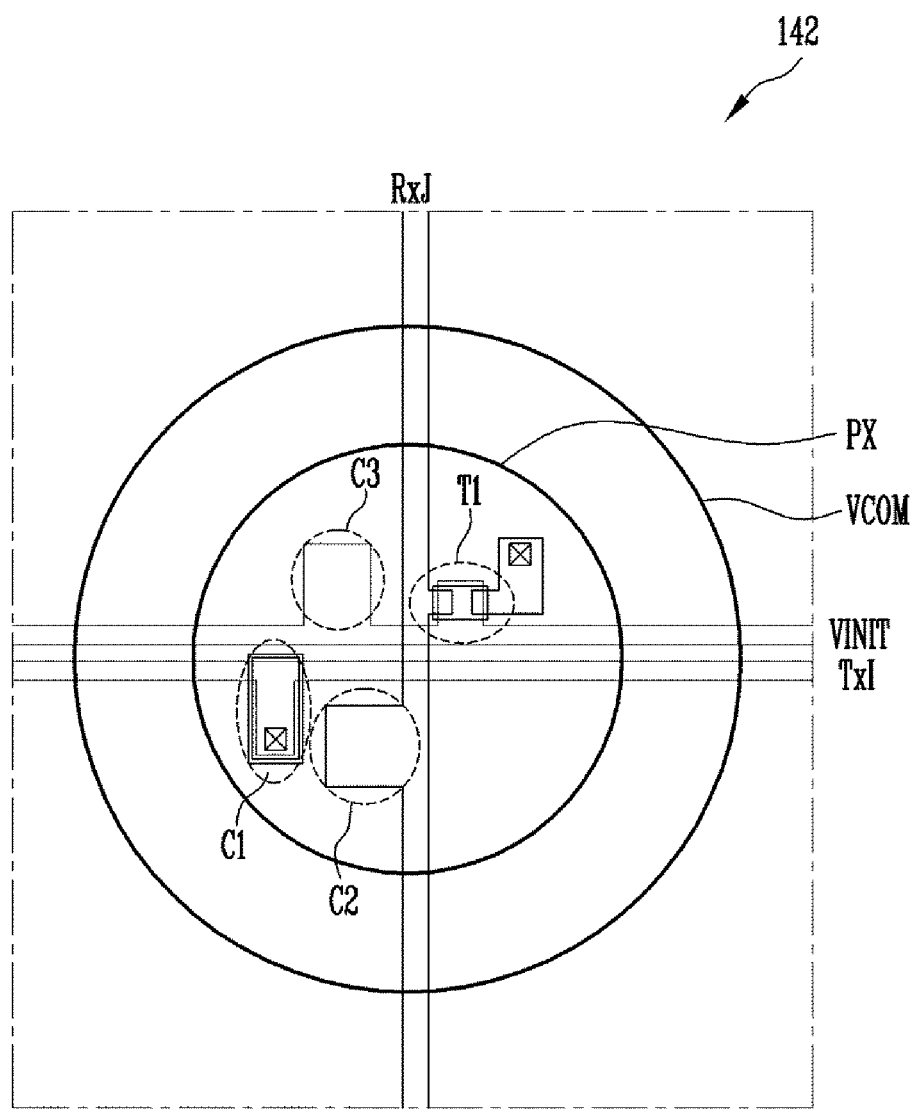
FIG. 23 is a diagram illustrating a layout of a unit sensor according to an exemplary embodiment of the invention.

FIGS. 22 and 23 illustrate the layout of the unit sensors according to exemplary embodiments, and more particularly, illustrate respective different modifications of the layout shown in FIG. 20. In FIGS. 22 and 23, like reference numerals are used to designate the same or similar elements as those of FIG. 20, and thus, repeated descriptions thereof will be omitted to avoid redundancy.

Referring to FIG. 22, the pixel electrode PX of each of the unit sensors 142 may be disposed over an intersection between the corresponding driving line TxI and the corresponding sensing line RxJ, such that the pixel electrode PX overlaps the driving line TxI and the sensing line RxJ. In this case, the switching element T1 may be coupled between the corresponding sensing line RxJ and the pixel electrode PX. The circuit elements (e.g., the switching element T1, and the first third capacitance elements C1, C2, and C3) of each of the unit sensors 142 may be disposed densely to each other under the corresponding pixel electrode PX.

In this manner, each pixel electrode PX may be designed to have a reduced size (surface area), which may reduce the blur effect. Furthermore, the capacitance elements (e.g., first to third capacitance elements C1, C2, and C3) of each unit sensor 142 may be configured using parasitic capacitances formed between the corresponding pixel electrode PX and the lines (e.g., the corresponding driving line TxI, the corresponding sensing line RxJ, and the initialization signal line VINIT). As such, the light transmittance of the fingerprint sensing area FSA may be improved, and prevent the image quality from being deteriorated due to a moire phenomenon.

Referring to FIG. 23, the pixel electrode PX of each of the unit sensors 142 may be patterned in a circular shape. In an exemplary embodiment, the common power source line VCOM may have a mesh shape and disposed in areas defined between the unit sensors 142, such that the common power source line VCOM is spaced apart from each pixel electrode PX by a predetermined distance. In this case, the common power source line VCOM may be provided in an area facing each pixel electrode PX and have a shape corresponding to the pixel electrode PX.

In this manner, because the pixel electrode PX has a circular shape, a fringe field may be minimized. As such, cross-talk between the unit sensors 142 may be minimized, and improve the reliability of the fingerprint sensor.

FIGS. 24A to 24D are cross-sectional views of a variable capacitance element 200 according to exemplary embodiments.

Figure 24A:
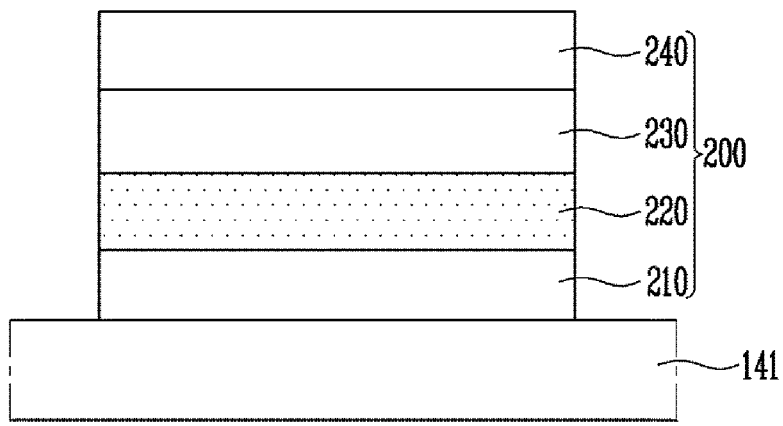
FIGS. 24A, 24B, 24C, and 24D are schematic cross-sectional views of a variable capacitance element according to exemplary embodiments of the invention.

Referring to FIG. 24A, the variable capacitance element 200 may include a first conductive pattern 210, a semiconductor pattern 220, an insulating layer 230, and a second conductive pattern 240 that are successively stacked on the sensor substrate 141. In an exemplary embodiment, the first conductive pattern 210 and the semiconductor pattern 220 may be electrically coupled to each other to form a first electrode of the variable capacitance element 200. The second conductive pattern 240 may be spaced apart from the first conductive pattern 210 and the semiconductor pattern 220 with the insulating layer 230 interposed therebetween, and may form a second electrode of the variable capacitance element 200.

The first conductive pattern 210 and the second conductive pattern 240 may be formed of various conductive materials, such as metals, an alloy thereof, a conductive polymer, and conductive metal oxide. Furthermore, the first conductive pattern 210 and the second conductive pattern 240 may each have a single layer structure or a multilayer structure, and may include the same conductive material or different conductive materials.

The semiconductor pattern 220 may be formed of an oxide semiconductor, such as ZnO, ZTO, ZIO, IZO, InO, TiO, IGZO, or IZTO, but it is not limited thereto. For example, the semiconductor pattern 220 may be formed of at least one of various materials capable of forming an active layer of a known thin-film transistor. In an exemplary embodiment, an impurity may be doped to a portion of the semiconductor pattern 220 to form a contact or control a carrier concentration.

The insulating layer 230 may include at least one organic layer and/or inorganic layer, and have a single layer structure or a multilayer structure. In other words, the material and structure of the insulating layer 230 are not specifically limited.

Figure 24B:
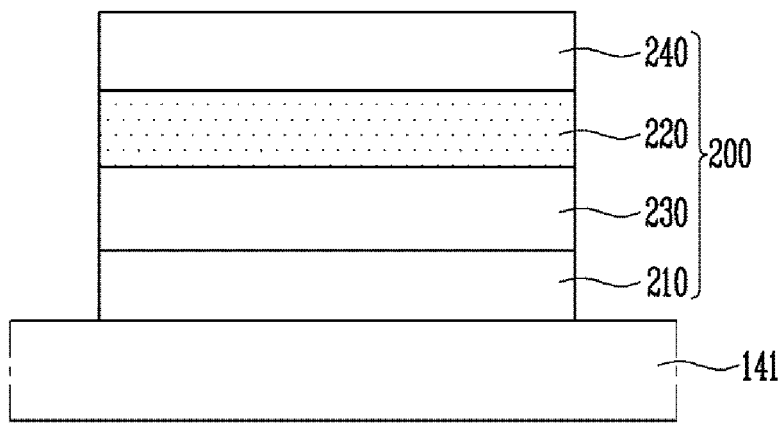

Referring to FIG. 24B, the positions of the semiconductor pattern 220 and the insulating layer 230 may be switched with each other. For example, the variable capacitance element 200 may include a first conductive pattern 210, an insulating layer 230, a semiconductor pattern 220, and a second conductive pattern 240 that are successively stacked on the sensor substrate 141. In this case, the first electrode of the variable capacitance element 200 may be formed of the first conductive pattern 210, and the second electrode of the variable capacitance element 200 may be formed of the semiconductor pattern 220 and the second conductive pattern 240.

Figure 24C:
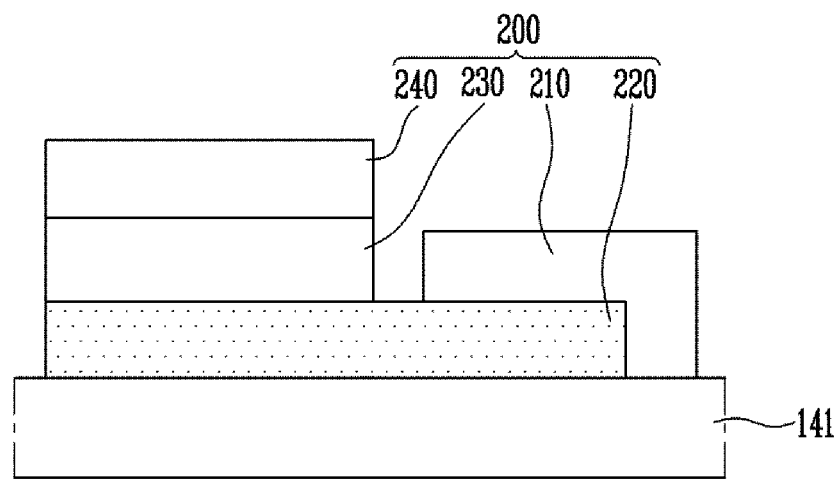
Figure 24D:
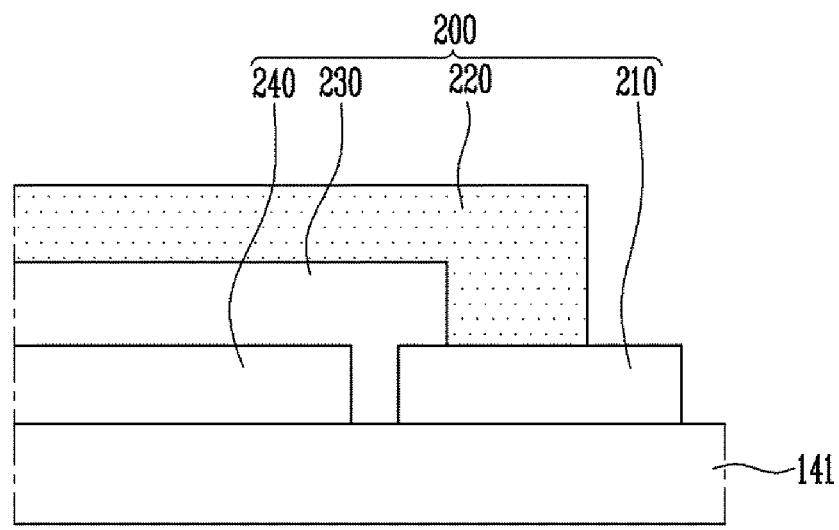

Referring to FIGS. 24C and 24D, the variable capacitance element 200 may have a coplanar or reverse-coplanar structure. For example, the first and second conductive patterns 210 and 240 may be disposed on substantially the same layer and formed through the same mask process. Furthermore, the first conductive pattern 210 and the semiconductor pattern 220 may be electrically coupled to each other through a predetermined area, thus forming one electrode of the variable capacitance element 200.

At least one of the first and second capacitance elements C1 and C2 of the unit sensor 142 according to an exemplary embodiment may include the variable capacitance element 200 having the structure shown in any one of FIGS. 24A to 24D. For example, in FIG. 21, the first capacitance element C1 has the structure shown in FIG. 24B, but the first capacitance element C1 may have structure shown in FIG. 24A, 24C, or 24D. Furthermore, as described above, the second capacitance element C2 may have a variable capacitance. For example, the second capacitance element C2 may be formed of a variable capacitance element 200 having the structure shown in any one of FIGS. 24A to 24D. However, the structure of the first and/or second capacitance element C1 and/or C2 is not limited to those shown in FIGS. 24A to 24D, and the structure of the first and/or second capacitance element C1 and/or C2 may be changed in various ways.

Various exemplary embodiments of the invention may provide a fingerprint sensor having high sensitivity and high reliability, and a display device having the fingerprint sensor.

In detail, according to the exemplary embodiments, a self capacitance pixel electrode PX, which forms a contact capacitance by making contact with a contact means, may be formed in each unit sensor 142. A pattern (ridge or valley) information of a fingerprint may be converted to a voltage to be applied to each corresponding pixel electrode PX through a coupling operation. According to exemplary embodiments, at least one variable capacitance element 200 (e.g., a first and/or second capacitance element C1 and/or C2) may be coupled between the driving lines Tx1 to TxN and the sensing lines Rx1 to RxM. During a predetermined sensing period, a difference between the charge amounts Q1 and Q2 of the unit sensors 142 may be detected in a mutual capacitance scheme using a C-V characteristic deviation of the variable capacitance element 200 to detect the shape of the fingerprint.

According to the exemplary embodiments, the sensitivity of the fingerprint sensor may be enhanced to a degree similar to that of a self capacitance type touch or fingerprint sensor. Moreover, the reliability of the fingerprint sensor may be improved from using the C-V characteristics, which do not significantly vary depending on a characteristic deviation of a transistor, temperature, and/or external light. Furthermore, the capacitance of the variable capacitance element 200 may be increased by adjusting a design value of the variable capacitance element 200. Thus, as compared to a typical mutual capacitance type touch/fingerprint sensor, the signal-to-noise ratio may be enhanced.

In addition, a difference between the charge amounts Q1 and Q2 of the unit sensors 142 is detected in a mutual capacitance scheme during the sensing period. Therefore, for example, when the fingerprint sensor is provided in the display device along with the mutual capacitance type touch sensor, both the touch sensor and the fingerprint sensor may be driven using the single sensor driving circuit 172. In this manner, the configuration of the sensor circuit unit 170 may be simplified, and the production cost thereof may be reduced. In addition, during the sensing period, because a difference between the charge amounts Q1 and Q2 of the unit sensors 142 is detected in a mutual capacitance scheme, it may be possible to sense multi-touches and multi-channels.

Furthermore, according to exemplary embodiments, the switching element T1 may be used to initialize or float the pixel electrode PX. The switching element T1 may be a transistor or the like. The switching element T1 may be provided to perform a simple switching operation, but not used in generating driving current unlike that of a sensor using a current sensing scheme. Therefore, as compared to a transistor used in the current sensing scheme, characteristic conditions required for the switching element T1 may be relatively easily satisfied. Thus, the switching element T1 may be formed by a high-temperature process or a low-temperature process. As a result, the process of forming the fingerprint sensor may be further facilitated, and the production cost thereof may be reduced.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A fingerprint sensor comprising:
   first, second, and third lines; and
   a unit sensor coupled to the first, the second, and the third lines,
   wherein the unit sensor comprises:
      a pixel electrode coupled between the first line and the second line;
      a first capacitance element coupled between the first line and the pixel electrode;
      a second capacitance element coupled between the second line and the pixel electrode;
      a switching element coupled between the pixel electrode and one of the first line, the second line, a first line of an adjacent unit sensor, and a second line of the adjacent unit sensor, and comprising a control electrode coupled to the third line; and
      a third capacitance element coupled between the third line and the pixel electrode, and
   wherein at least one of the first and the second capacitance elements comprises a variable capacitance element.

2. The fingerprint sensor according to claim 1, further comprising a fourth line disposed around the unit sensor and configured to form a parasitic capacitance between the fourth line and the pixel electrode.

3. The fingerprint sensor according to claim 2, wherein the fourth line surrounds the pixel electrode.

4. The fingerprint sensor according to claim 1, wherein:
   the first and the second lines extend in different directions to intersect with each other; and
   the pixel electrode is disposed in a unit area defined by the first and the second lines.

5. The fingerprint sensor according to claim 1, wherein the pixel electrode has a circular shape.

6. The fingerprint sensor according to claim 1, wherein at least one of the first and the second capacitance elements comprises a metal insulator semiconductor (MIS) or metal insulator semiconductor metal (MISM) capacitance element.

7. The fingerprint sensor according to claim 1, wherein:
   the first line is provided in plural;
   the second line is provided in plural; and
   the unit sensor is provided in plural, the unit sensors disposed in respective unit areas corresponding to intersections between the first and the second lines.

8. The fingerprint sensor according to claim 7, further comprising a fourth line disposed between the unit sensors and configured to form a parasitic capacitance between the fourth line and the pixel electrode of each of the unit sensors.

9. The fingerprint sensor according to claim 8, wherein:
   the unit sensors are simultaneously supplied with an initialization signal through the third line during an initialization period; and
   one of the first and second lines coupled to the switching element are simultaneously supplied with a reset voltage during a period in which the initialization signal is supplied.

10. The fingerprint sensor according to claim 9, wherein the fourth line is supplied with the reset voltage during the period in which the initialization signal is supplied.

11. The fingerprint sensor according to claim 9, wherein:
the first lines are successively supplied with a driving signal during a sensing period following the initialization period; and
a sensing signal is output through the second lines during the sensing period.

12. The fingerprint sensor according to claim 7, wherein the pixel electrode of each of the unit sensors is disposed in an area between the first and the second lines.

13. The fingerprint sensor according to claim 7, wherein the pixel electrode of each of the unit sensors is disposed over an intersection between the first and the second lines such that the pixel electrode overlaps any one of the first and the second lines.

14. A display device comprising:
a display panel comprising display pixels disposed in a display area; and
a fingerprint sensor comprising:
a plurality of first and second lines and at least one third line disposed in a fingerprint sensing area overlapping the display area; and
a plurality of unit sensors coupled to the first and the second lines and the third line,
wherein at least one of the unit sensors comprises:
a pixel electrode coupled between predetermined first and second lines of the first and the second lines;
a first capacitance element coupled between the predetermined first line and the pixel electrode;
a second capacitance element coupled between the predetermined second line and the pixel electrode;
a switching element coupled between the pixel electrode and one of the predetermined first line, the predetermined second line, a first line of an adjacent unit sensor, and a second line of the adjacent unit sensor, and comprising a control electrode coupled to the third line; and
a third capacitance element coupled between the third line and the pixel electrode, and
wherein at least one of the first and the second capacitance elements comprises a variable capacitance element.

15. The display device according to claim 14, wherein an entire display area is set as the fingerprint sensing area.

16. The display device according to claim 14, wherein:
a portion of the display area is set as the fingerprint sensing area; and
another portion of the display area is set as a touch sensing area.

17. The display device according to claim 16, wherein:
the fingerprint sensing area and the touch sensing area comprise the pixel electrode and a touch electrode disposed on a same sensor substrate.

18. The display device according to claim 14, further comprising:
a touch sensor disposed around the fingerprint sensor and overlapping the display area;
a sensor driving circuit configured to drive the touch sensor and the fingerprint sensor; and
a selection circuit configured to selectively couple the touch sensor or the fingerprint sensor to the sensor driving circuit.

19. The display device according to claim 18, wherein the selection circuit is configured to:
simultaneously couple input/output lines of the touch sensor to the sensor driving circuit, in response to a first mode; and
divide the first and the second lines into a plurality of groups and alternately couple the first and second lines of each of the groups to the sensor driving circuit, in response to a second mode.

20. The display device according to claim 14, further comprising a fourth line disposed between the unit sensors and configured to form a parasitic capacitance between the fourth line and the pixel electrode of each of the unit sensors.

21. The display device according to claim 20, wherein:
the unit sensors are simultaneously supplied with an initialization signal through the third line during an initialization period; and
the first and second lines coupled to the switching element are simultaneously supplied with a reset voltage during a period in which the initialization signal is supplied.

22. The display device according to claim 21, wherein the fourth line is supplied with the reset voltage during the period in which the initialization signal is supplied.

23. The display device according to claim 21, wherein:
the first lines are successively supplied with a driving signal during a sensing period following the initialization period; and
a sensing signal is output through the second lines during the sensing period.

24. The display device according to claim 20, wherein:
the pixel electrode of each of the unit sensors has a circular shape; and
the fourth line is spaced apart from the pixel electrode of each of the unit sensors by a predetermined distance and has a mesh shape in an area between the unit sensors.

25. The display device according to claim 14, wherein the pixel electrode of each of the unit sensors is disposed in an area between the first and the second lines.

26. The display device according to claim 14, wherein the pixel electrode of each of the unit sensors is disposed over an intersection between the first and the second lines such that the pixel electrode overlaps any one of the first and the second lines.

* * * * *